United States Patent
Xu et al.

(10) Patent No.: US 12,445,871 B2
(45) Date of Patent: Oct. 14, 2025

(54) SUBCARRIER SPACING FOR UE-TO-UE CROSS LINK INTERFERENCE MEASUREMENT

(71) Applicant: QUALCOMM Incorporated, San Diego, CA (US)

(72) Inventors: Huilin Xu, San Diego, CA (US); Alexandros Manolakos, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 16/738,969

(22) Filed: Jan. 9, 2020

(65) Prior Publication Data

US 2020/0229009 A1    Jul. 16, 2020

(30) Foreign Application Priority Data

Jan. 11, 2019  (GR) .............................. 20190100018

(51) Int. Cl.
*H04W 24/08*  (2009.01)
*H04B 17/318*  (2015.01)
*H04W 72/541*  (2023.01)

(52) U.S. Cl.
CPC .......... *H04W 24/08* (2013.01); *H04B 17/318* (2015.01); *H04W 72/541* (2023.01)

(58) Field of Classification Search
CPC ... H04W 24/08; H04W 72/082; H04W 24/10; H04B 17/318; H04B 17/24;
(Continued)

(56) References Cited

U.S. PATENT DOCUMENTS

2014/0206341 A1   7/2014  Siomina et al.
2018/0287739 A1   10/2018 Kim et al.
(Continued)

FOREIGN PATENT DOCUMENTS

CN        108289325 A      7/2018
WO    WO-2018084985 A1    5/2018

OTHER PUBLICATIONS

CATT: "Remaining Details of UE-to-UE Cross Link Interference Measurements," 3GPP Draft, 3GPP TSG RAN WG1 Meeting NR#3, R1-1715837, Measurements CLI, 3rd Generation Partnership Project (3GPP), Mobile Competence Centre, 650, Route Des Lucioles, F-06921, Sophia-Antipolis Cedex, France, vol. RAN WG1, No. Nagoya, Japan, Sep. 18, 2017-Sep. 21, 2017, Sep. 17, 2017 (Sep. 17, 2017), XP051339297, 3 pages, Retrieved from the Internet:URL: http://www.3gpp.org/ftp/Meetings_3GPP_SYNC/RAN1/Docs/ [retrieved on Sep. 17, 2017] section 2, p. 2.

(Continued)

*Primary Examiner* — Peter P Chau
(74) *Attorney, Agent, or Firm* — Holland & Hart LLP

(57) ABSTRACT

Methods, systems, and devices for wireless communications are described. A first user equipment (UE) served by a first cell and a second UE served by a second cell may experience cross link interference (CLI). The UEs may have different subcarrier spacing (SCS) configurations. For example, the uplink SCS of the aggressor UE may be different from the downlink SCS of the victim UE. The serving base stations may configure the UEs with one or more parameters for generating and measuring a signal used to manage the CLI. The parameters may be based on the uplink SCS of the aggressor and the downlink SCS of the victim. The aggressor UE may apply the parameters to generate the CLI measurement signal, and the victim UE may apply the parameters to measure the CLI measurement signal, so the (Continued)

signal from the transmitter fits into the resource grid of the receiver.

20 Claims, 19 Drawing Sheets

(58) Field of Classification Search
CPC ............ H04B 17/345; H04L 27/26025; H04L 5/0091; H04L 5/0073; H04J 11/0023
See application file for complete search history.

(56) References Cited

U.S. PATENT DOCUMENTS

| | | | | |
|---|---|---|---|---|
| 2018/0323916 | A1* | 11/2018 | Yang | H04L 5/0053 |
| 2018/0323928 | A1 | 11/2018 | Yang | |
| 2019/0124637 | A1* | 4/2019 | Li | H04L 5/0044 |
| 2020/0067612 | A1* | 2/2020 | Wu | H04W 24/10 |
| 2020/0112420 | A1* | 4/2020 | Xu | H04L 5/0073 |
| 2020/0305163 | A1* | 9/2020 | Liu | H04W 72/0446 |
| 2020/0344034 | A1* | 10/2020 | Moon | H04W 72/1263 |
| 2020/0389805 | A1* | 12/2020 | Kim | H04W 72/042 |

OTHER PUBLICATIONS

Huawei, et al: "UE-to-UE Measurement for Cross-link Interference Mitigation," 3GPP Draft, 3GPP TSG RAN WG1 Meeting #92, R1-1801798, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 26, 2018-Mar. 2, 2018, Feb. 17, 2018 (Feb. 17, 2018), XP051397772, 13 pages, Retrieved from the Internet: http://www.3gpp.org/ftp/tsg%5Fran/WG1%5FRL1/TSGR1%5F92/Docs/ [retrieved on Feb. 17, 2018] section 2.1, the whole document.

Intel Corporation: "On Cross-Link Interference Measurement for NR Dynamic TDD," 3GPP TSG RAN1 WG Meeting NR AH 1701, 3GPP Draft, R1-1704775, On Cross Link Interference Measurement for NR TDD, 3rd Generation Partnership Project (3GPP), Mobile Competence Centre; 650, Route Des Lucioles; F-06921 Sophia-Antipolis Cedex, vol. RAN WG1, No. Spokane, WA, USA; Apr. 3, 2017-Apr. 7, 2017, Apr. 2, 2017, XP051242912, 5 pages. Retrieved from the Internet: URL: http://www.3gpp.org/ftp/Meetings_3GPP_SYNC/RAN1/Docs/ [retrieved on Apr. 2, 2017] pp. 2-4.

International Search Report and Written Opinion—PCT/US2020/013226—ISA/EPO—Jun. 23, 2020.

Partial International Search Report—PCT/US2020/013226—ISA/EPO—Apr. 6, 2020.

Huawai, et al., "On CLI Measurement and Power Control for Cross-link Interference Mitigation", 3GPP TSG RAN WG1 Meeting #88bis, R1-1704255, Spokane, USA, Apr. 3-7, 2017 , 7 pages.

* cited by examiner

SUBCARRIER SPACING FOR UE-TO-UE CROSS LINK INTERFERENCE MEASUREMENT

CROSS REFERENCE

The present application for patent claims the benefit of Greece Provisional Patent Application No. 20190100018 by XU, et al., entitled "SUBCARRIER SPACING FOR UE-TO-UE CROSS LINK INTERFERENCE MEASUREMENT," filed Jan. 11, 2019, assigned to the assignee hereof, and expressly incorporated by reference herein.

BACKGROUND

The following relates generally to wireless communications, and more specifically to subcarrier spacing for UE-to-UE cross link interference measurement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Neighboring cells in a time domain duplexed (TDD) system may use different configurations for TDD communications. In some cases, the different TDD configurations may lead to overlap for transmission in opposite directions. For example, an uplink transmission by a first UE may interfere with downlink reception at a second UE if the uplink transmission and downlink reception are scheduled for the same time. Interference between UEs associated with different TDD configurations in a TDD system may be known as cross-link interference (CLI). Current techniques for managing CLI in a TDD system may result in inefficient use of communication resources.

SUMMARY

The described techniques relate to improved methods, systems, devices, and apparatuses that support subcarrier spacing (SCS) for user equipment (UE)-to-UE cross-link interference (CLI) measurement. Generally, the described techniques provide for applying a transmission configuration at a transmitting UE and a reception configuration at a receiving UE such that the transmitting UE can transmit a signal used for CLI management to the receiving UE, even if the transmitting UE and the receiving UE have different SCS. SCS for a UE in a cell may be configured by a base station providing the cell. SCS may be configured per cell or per bandwidth part (BWP), where the SCS configuration is indicated to the UE via higher layer signaling, such as radio resource control (RRC) signaling. SCS may also be separately configured for uplink communications and downlink communications. Based on the independent and separate configuration of SCS, the uplink SCS of a first UE may be different from the downlink SCS of a second UE. If a first time division duplex (TDD) configuration for the first UE and a second TDD configuration for the second UE are configured to result in CLI, an aggressor UE may transmit a signal (e.g., a reference signal) to be measured by a victim UE. However, if the uplink SCS configuration of the aggressor UE does not match the downlink SCS configuration of the victim UE, the victim UE may be unable to successfully receive the signal and perform the measurement.

To enable measuring CLI for UEs with different SCS configurations, the UEs involved in the CLI measurement may apply parameters associated with transmission or reception of signals used for the CLI measurement (e.g., reference signals). The parameters may be provided by the serving base station(s) (e.g., in a configuration), and the UEs may adjust their transmission or reception configurations such that the uplink subcarriers of transmitting UEs align with downlink subcarriers of receiving UEs. Additionally, or alternatively, the UEs may apply the parameters such that the signal symbols of the UE with the higher SCS are repeated to match the symbol duration of the UE with the lower SCS. The parameters may include indicators for a configuration of a receiver frequency domain comb factor, a transmitter frequency domain comb factor, a receiver frequency domain comb offset, a transmitter frequency domain comb offset, a number of measurement OFDM symbols, an amount of phase shifting, or any combination thereof. In some cases, some of the parameters may be based on a ratio between the uplink SCS of a transmitting UE and the downlink SCS of a receiving UE. The ratio may be from the uplink SCS to the downlink SCS if the uplink SCS is larger than the downlink SCS, and the ratio may be from the downlink SCS to the uplink SCS if the downlink SCS is larger than the uplink SCS.

A method of wireless communications is described. The method may include receiving, at a first UE configured for communication using a first subcarrier spacing, a configuration for performing a CLI measurement of a signal transmitted from a second UE at a second subcarrier spacing, determining if the second subcarrier spacing is different from the first subcarrier spacing, and refraining from performing the CLI measurement if the second subcarrier spacing is different from the first subcarrier spacing.

An apparatus for wireless communications is described. The apparatus may include a processor, memory coupled with the processor, and instructions stored in the memory. The instructions may be executable by the processor to cause the apparatus to receive, at a first UE configured for communication using a first subcarrier spacing, a configuration for performing a CLI measurement of a signal transmitted from a second UE at a second subcarrier spacing, determine whether the second subcarrier spacing is different from the first subcarrier spacing, and refrain from performing the CLI measurement if the second subcarrier spacing is different from the first subcarrier spacing.

Another apparatus for wireless communications is described. The apparatus may include means for receiving, at a first UE configured for communication using a first subcarrier spacing, a configuration for performing a CLI measurement of a signal transmitted from a second UE at a second subcarrier spacing, determining whether the second subcarrier spacing is different from the first subcarrier spacing, and refraining from performing the CLI measurement if the second subcarrier spacing is different from the first subcarrier spacing.

A non-transitory computer-readable medium storing code for wireless communications is described. The code may include instructions executable by a processor to receive, at a first UE configured for communication using a first subcarrier spacing, a configuration for performing a CLI measurement of a signal transmitted from a second UE at a second subcarrier spacing, determine whether the second subcarrier spacing is different from the first subcarrier spacing, and refrain from performing the CLI measurement if the second subcarrier spacing is different from the first subcarrier spacing.

Some examples of the method, apparatuses, and non-transitory computer-readable medium described herein may further include operations, features, means, or instructions for performing the CLI measurement on the signal to obtain a signal characteristic associated with the signal if the second subcarrier spacing is the same as the first subcarrier spacing, and reporting the signal characteristic to a serving base station.

In some examples of the method, apparatuses, and non-transitory computer-readable medium described herein, the configuration includes a first configuration associated with a signal received power-type CLI measurement, and the refraining from performing the CLI measurement may be based on the signal received power-type CLI measurement.

Some examples of the method, apparatuses, and non-transitory computer-readable medium described herein may further include operations, features, means, or instructions for receiving a second configuration for performing a received power-type CLI measurement at the second subcarrier spacing, performing the received power-type CLI measurement at the second subcarrier spacing, and reporting a characteristic measured from the received power-type CLI measurement to a serving base station.

In some examples of the method, apparatuses, and non-transitory computer-readable medium described herein, the first UE may be served by a first cell of a first base station and the second UE may be served by a second cell of a second, different base station.

In some examples of the method, apparatuses, and non-transitory computer-readable medium described herein, the first UE and second UEs may be served by a same cell.

Some examples of the method, apparatuses, and non-transitory computer-readable medium described herein may further include operations, features, means, or instructions for receiving a measurement gap for performing the CLI measurement, where the measurement gap may be configured based on a type of the CLI measurement, the first subcarrier spacing, and the second subcarrier spacing, switching to the second subcarrier spacing for the measurement gap, performing the CLI measurement of the signal from the second UE based on the type of the CLI measurement to obtain a signal characteristic of the signal, and reporting the signal characteristic to a serving base station.

A method of wireless communications is described. The method may include identifying, at a first UE associated with a first subcarrier spacing, a parameter for reception of a signal from a second UE at a second subcarrier spacing, determining a type of a CLI measurement procedure to perform, measuring a signal characteristic of the signal from the second UE based on the parameter and the type of the CLI measurement procedure, and reporting the signal characteristic to a serving base station.

An apparatus for wireless communications is described. The apparatus may include a processor, memory in electronic communication with the processor, and instructions stored in the memory. The instructions may be executable by the processor to cause the apparatus to identify, at a first UE associated with a first subcarrier spacing, a parameter for reception of a signal from a second UE at a second subcarrier spacing, determine a type of a CLI measurement procedure to perform, measure a signal characteristic of the signal from the second UE based on the parameter and the type of the CLI measurement procedure, and report the signal characteristic to a serving base station.

Another apparatus for wireless communications is described. The apparatus may include means for identifying, at a first UE associated with a first subcarrier spacing, a parameter for reception of a signal from a second UE at a second subcarrier spacing, determining a type of a CLI measurement procedure to perform, measuring a signal characteristic of the signal from the second UE based on the parameter and the type of the CLI measurement procedure, and reporting the signal characteristic to a serving base station.

A non-transitory computer-readable medium storing code for wireless communications is described. The code may include instructions executable by a processor to identify, at a first UE associated with a first subcarrier spacing, a parameter for reception of a signal from a second UE at a second subcarrier spacing, determine a type of a CLI measurement procedure to perform, measure a signal characteristic of the signal from the second UE based on the parameter and the type of the CLI measurement procedure, and report the signal characteristic to a serving base station.

In some examples of the method, apparatuses, and non-transitory computer-readable medium described herein, the parameter indicates that the first subcarrier spacing may be smaller than the second subcarrier spacing, and where measuring the signal characteristic may include operations, features, means, or instructions for adjusting a frequency domain comb factor of a receiver based on the parameter.

In some examples of the method, apparatuses, and non-transitory computer-readable medium described herein, the parameter indicates that the first subcarrier spacing may be smaller than the second subcarrier spacing, and where measuring the signal characteristic may include operations, features, means, or instructions for adjusting a frequency domain comb offset of a receiver based on the parameter.

In some examples of the method, apparatuses, and non-transitory computer-readable medium described herein, the parameter indicates that the first subcarrier spacing may be greater than the second subcarrier spacing, and where measuring the signal characteristic may include operations, features, means, or instructions for adjusting a number of measurement symbols for measuring the signal characteristic based on the parameter.

In some examples of the method, apparatuses, and non-transitory computer-readable medium described herein, measuring the signal characteristic may include operations, features, means, or instructions for applying a rotation to at least one symbol of the measurement symbols for demodulation of the signal.

Some examples of the method, apparatuses, and non-transitory computer-readable medium described herein may further include operations, features, means, or instructions for applying the rotation includes time domain rotation of the at least one symbol or frequency domain phase ramping for the at least one symbol.

Some examples of the method, apparatuses, and non-transitory computer-readable medium described herein may further include operations, features, means, or instructions for measuring the signal characteristic may be based on a phase continuity between the measurement symbols of the signal.

In some examples of the method, apparatuses, and non-transitory computer-readable medium described herein, the type of CLI measurement procedure includes a signal received power-type CLI measurement procedure.

In some examples of the method, apparatuses, and non-transitory computer-readable medium described herein, the type of CLI measurement procedure may be based on the first subcarrier spacing being equivalent to the second subcarrier spacing.

In some examples of the method, apparatuses, and non-transitory computer-readable medium described herein, the type of CLI measurement procedure may be a total received power-type CLI measurement procedure.

In some examples of the method, apparatuses, and non-transitory computer-readable medium described herein, the type of CLI measurement procedure may be based at least in part the first subcarrier spacing being different from the second subcarrier spacing.

In some examples of the method, apparatuses, and non-transitory computer-readable medium described herein, the first UE may be served by a first cell of a first base station and the second UE may be served by a second cell of a second, different base station.

In some examples of the method, apparatuses, and non-transitory computer-readable medium described herein, the first UE and second UEs may be served by a same cell.

In some examples of the method, apparatuses, and non-transitory computer-readable medium described herein, measuring the signal characteristic may include operations, features, means, or instructions for receiving a configuration for a dedicated measurement gap for the CLI measurement procedure, where the measurement gap may be configured based on the type of the CLI measurement procedure, the first subcarrier spacing, and the second subcarrier spacing, and switching to the second subcarrier spacing for the measurement gap.

A method of wireless communications is described. The method may include identifying, at a first UE, a parameter for transmission of a signal to a second UE, where the first UE is configured for communication using a first subcarrier spacing and the second UE is configured for communication using a second subcarrier spacing, generating the signal based on the parameter, and transmitting the signal to the second UE.

An apparatus for wireless communications is described. The apparatus may include a processor, memory in electronic communication with the processor, and instructions stored in the memory. The instructions may be executable by the processor to cause the apparatus to identify, at a first UE, a parameter for transmission of a signal to a second UE, where the first UE is configured for communication using a first subcarrier spacing and the second UE is configured for communication using a second subcarrier spacing, generate the signal based on the parameter, and transmit the signal to the second UE.

Another apparatus for wireless communications is described. The apparatus may include means for identifying, at a first UE, a parameter for transmission of a signal to a second UE, where the first UE is configured for communication using a first subcarrier spacing and the second UE is configured for communication using a second subcarrier spacing, generating the signal based on the parameter, and transmitting the signal to the second UE.

A non-transitory computer-readable medium storing code for wireless communications is described. The code may include instructions executable by a processor to identify, at a first UE, a parameter for transmission of a signal to a second UE, where the first UE is configured for communication using a first subcarrier spacing and the second UE is configured for communication using a second subcarrier spacing, generate the signal based on the parameter, and transmit the signal to the second UE.

In some examples of the method, apparatuses, and non-transitory computer-readable medium described herein, the parameter indicates that the first subcarrier spacing may be smaller than the second subcarrier spacing, and where generating the signal may include operations, features, means, or instructions for adjusting a frequency domain comb factor for generating the signal based on the parameter.

In some examples of the method, apparatuses, and non-transitory computer-readable medium described herein, the parameter indicates that the first subcarrier spacing may be smaller than the second subcarrier spacing, and where generating the signal may include operations, features, means, or instructions for adjusting a frequency domain comb offset for generating the signal based on the parameter.

In some examples of the method, apparatuses, and non-transitory computer-readable medium described herein, the parameter indicates that the first subcarrier spacing may be greater than the second subcarrier spacing, and where generating the signal may include operations, features, means, or instructions for adjusting a number of transmitted symbols for the signal based on the parameter.

In some examples of the method, apparatuses, and non-transitory computer-readable medium described herein, generating the signal may include operations, features, means, or instructions for applying a rotation to at least one symbol of the transmitted symbols to maintain a phase continuity for the transmitted symbols.

Some examples of the method, apparatuses, and non-transitory computer-readable medium described herein may further include operations, features, means, or instructions for applying the rotation includes time domain rotation of the at least one symbol or frequency domain phase ramping for the at least one symbol.

In some examples of the method, apparatuses, and non-transitory computer-readable medium described herein, the first UE may be served by a first cell of a first base station and the second UE may be served by a second cell of a second, different base station.

In some examples of the method, apparatuses, and non-transitory computer-readable medium described herein, the first UE and second UEs may be served by a same cell.

A method of wireless communications is described. The method may include identifying, at a base station serving a first UE, an overlap between a downlink symbol or a flexible symbol for the first UE and an uplink symbol for a second UE, where the first UE is configured for communication using a first subcarrier spacing and the second UE is configured for communication using a second subcarrier spacing, determining a type of a CLI measurement to be performed by the first UE, transmitting a configuration to the first UE for reception of a signal transmitted at the second subcarrier spacing from the second UE for the CLI measurement, and receiving a signal characteristic measured by the first UE for the CLI measurement.

An apparatus for wireless communications is described. The apparatus may include a processor, memory in electronic communication with the processor, and instructions stored in the memory. The instructions may be executable by the processor to cause the apparatus to identify, at a base station serving a first UE, an overlap between a downlink symbol or a flexible symbol for the first UE and an uplink symbol for a second UE, where the first UE is configured for communication using a first subcarrier spacing and the second UE is configured for communication using a second subcarrier spacing, determine a type of a CLI measurement to be performed by the first UE, transmit a configuration to the first UE for reception of a signal transmitted at the second subcarrier spacing from the second UE for the CLI measurement, and receive a signal characteristic measured by the first UE for the CLI measurement.

Another apparatus for wireless communications is described. The apparatus may include means for identifying, at a base station serving a first UE, an overlap between a downlink symbol or a flexible symbol for the first UE and an uplink symbol for a second UE, where the first UE is configured for communication using a first subcarrier spacing and the second UE is configured for communication using a second subcarrier spacing, determining a type of a CLI measurement to be performed by the first UE, transmitting a configuration to the first UE for reception of a signal transmitted at the second subcarrier spacing from the second UE for the CLI measurement, and receiving a signal characteristic measured by the first UE for the CLI measurement.

A non-transitory computer-readable medium storing code for wireless communications is described. The code may include instructions executable by a processor to identify, at a base station serving a first UE, an overlap between a downlink symbol or a flexible symbol for the first UE and an uplink symbol for a second UE, where the first UE is configured for communication using a first subcarrier spacing and the second UE is configured for communication using a second subcarrier spacing, determine a type of a CLI measurement to be performed by the first UE, transmit a configuration to the first UE for reception of a signal transmitted at the second subcarrier spacing from the second UE for the CLI measurement, and receive a signal characteristic measured by the first UE for the CLI measurement.

In some examples of the method, apparatuses, and non-transitory computer-readable medium described herein, the type of the CLI measurement may be a signal received power-type CLI measurement and the configuration includes a ratio of the second subcarrier spacing to the first subcarrier spacing.

Some examples of the method, apparatuses, and non-transitory computer-readable medium described herein may further include operations, features, means, or instructions for determining the type of the CLI measurement to be a signal received power-type CLI measurement based on the first subcarrier spacing being equivalent to the second subcarrier spacing.

Some examples of the method, apparatuses, and non-transitory computer-readable medium described herein may further include operations, features, means, or instructions for determining the type of the CLI measurement to be a total received power-type CLI measurement based on the first subcarrier spacing being different from the second subcarrier spacing.

In some examples of the method, apparatuses, and non-transitory computer-readable medium described herein, the base station serves the first UE via a first cell and the second UE may be served by a second cell of a second, different base station.

In some examples of the method, apparatuses, and non-transitory computer-readable medium described herein, the base station serves the first UE and the second UE via a same cell.

In some examples of the method, apparatuses, and non-transitory computer-readable medium described herein, measuring the signal characteristic may include operations, features, means, or instructions for configuring a dedicated measurement gap for the CLI measurement based on the type of the CLI measurement, the first subcarrier spacing, and the second subcarrier spacing, and transmitting an indicator of the dedicated measurement gap to the first UE.

A method of wireless communications is described. The method may include identifying, at a base station serving a first UE, an overlap between an uplink symbol for the first UE and a downlink or flexible symbol for a second UE, where the first UE is configured for communication using a first subcarrier spacing and the second UE is configured for communication using a second subcarrier spacing, determining a type of a CLI measurement to be performed by the second UE, and transmitting a configuration to the first UE for transmission of a signal at the first subcarrier spacing to the second UE for the CLI measurement.

An apparatus for wireless communications is described. The apparatus may include a processor, memory in electronic communication with the processor, and instructions stored in the memory. The instructions may be executable by the processor to cause the apparatus to identify, at a base station serving a first UE, an overlap between an uplink symbol for the first UE and a downlink or flexible symbol for a second UE, where the first UE is configured for communication using a first subcarrier spacing and the second UE is configured for communication using a second subcarrier spacing, determine a type of a CLI measurement to be performed by the second UE, and transmit a configuration to the first UE for transmission of a signal at the first subcarrier spacing to the second UE for the CLI measurement.

Another apparatus for wireless communications is described. The apparatus may include means for identifying, at a base station serving a first UE, an overlap between an uplink symbol for the first UE and a downlink or flexible symbol for a second UE, where the first UE is configured for communication using a first subcarrier spacing and the second UE is configured for communication using a second subcarrier spacing, determining a type of a CLI measurement to be performed by the second UE, and transmitting a configuration to the first UE for transmission of a signal at the first subcarrier spacing to the second UE for the CLI measurement.

A non-transitory computer-readable medium storing code for wireless communications is described. The code may include instructions executable by a processor to identify, at a base station serving a first UE, an overlap between an uplink symbol for the first UE and a downlink or flexible symbol for a second UE, where the first UE is configured for communication using a first subcarrier spacing and the second UE is configured for communication using a second subcarrier spacing, determine a type of a CLI measurement to be performed by the second UE, and transmit a configuration to the first UE for transmission of a signal at the first subcarrier spacing to the second UE for the CLI measurement.

In some examples of the method, apparatuses, and non-transitory computer-readable medium described herein, the type of the CLI measurement procedure may be an RSRP-type CLI measurement and the configuration includes a ratio of the second subcarrier spacing to the first subcarrier spacing.

Some examples of the method, apparatuses, and non-transitory computer-readable medium described herein may further include operations, features, means, or instructions for determining the type of the CLI measurement to be a signal received power-type CLI measurement based on the first subcarrier spacing being equivalent to the second subcarrier spacing.

Some examples of the method, apparatuses, and non-transitory computer-readable medium described herein may further include operations, features, means, or instructions for determining the type of the CLI measurement to be a total received power-type CLI measurement based on the first subcarrier spacing being different from the second subcarrier spacing.

Some examples of the method, apparatuses, and non-transitory computer-readable medium described herein may further include operations, features, means, or instructions for adjusting a symbol pattern for the first UE for a slot including transmission of the signal based on the first subcarrier spacing being different from the second subcarrier spacing.

In some examples of the method, apparatuses, and non-transitory computer-readable medium described herein, the adjusting the symbol pattern includes determining each symbol for the first UE overlapping with a receive symbol for the signal for the second UE to be an uplink symbol.

In some examples of the method, apparatuses, and non-transitory computer-readable medium described herein, the base station serves the first UE via a first cell and the second UE may be served by a second cell of a second, different base station.

In some examples of the method, apparatuses, and non-transitory computer-readable medium described herein, the base station serves the first UE and the second UE via a same cell.

DETAILED DESCRIPTION

Figure 1:
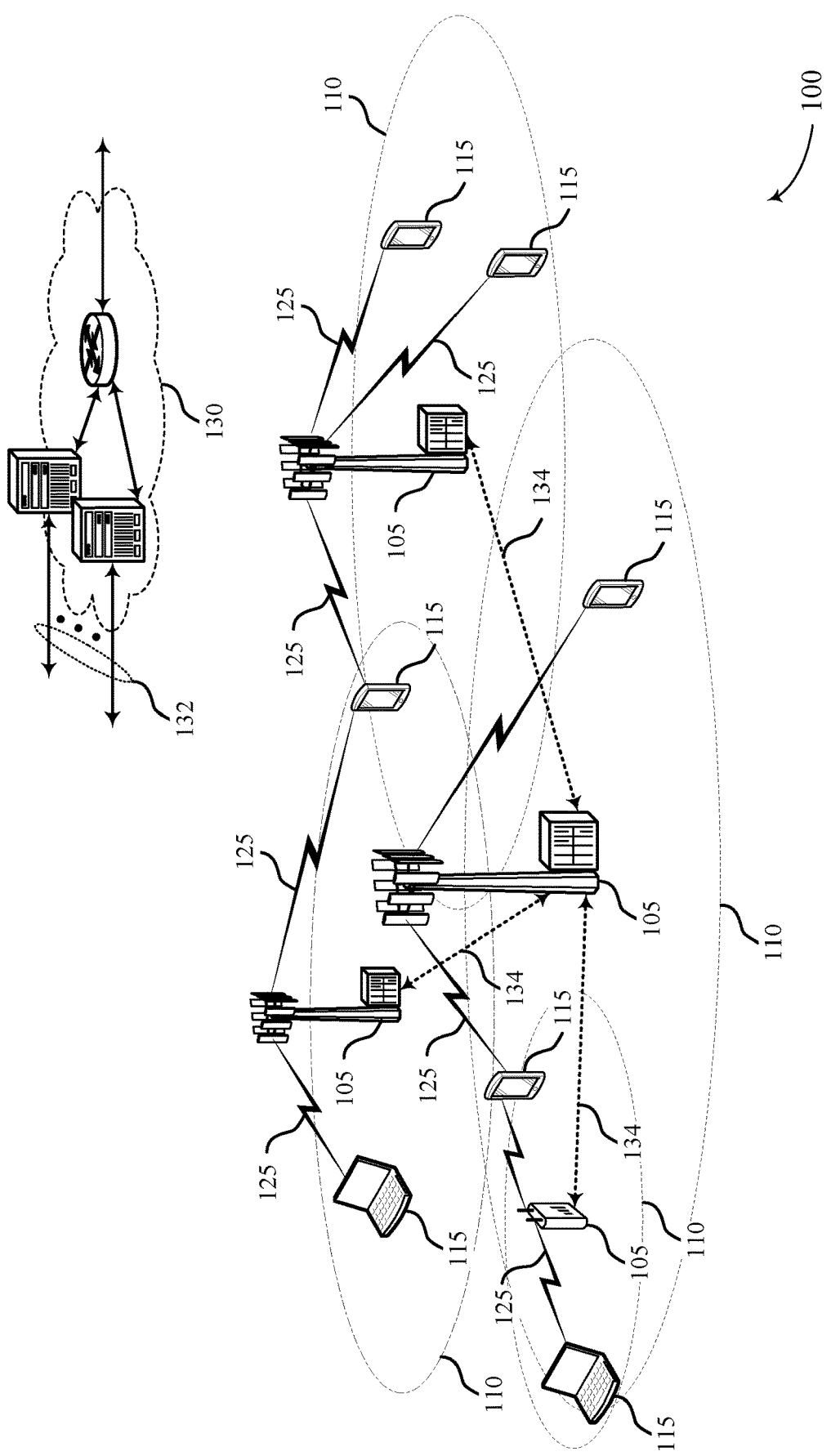
FIG. 1 illustrates an example of a system for wireless communications that supports subcarrier spacing for user equipment (UE)-to-UE cross link interference measurement in accordance with aspects of the present disclosure.

A wireless communications system may use time division duplexed (TDD) communications, where a wireless channel or carrier is used for both uplink transmissions and downlink transmissions. In some cases, a cell may modify the slot format for UEs or groups of UEs to follow a change of traffic. For example, if the traffic in the cell shifts toward being more uplink-heavy, the cell may change the slot format of the TDD configuration for one or more UEs to using slots which have more uplink symbol periods. The base station may indicate the dynamic TDD configuration to UEs in the cell, and the new TDD configuration may be used for communications by the UEs. In some cases, neighboring cells or different UEs within a cell may use different TDD configurations, which can lead to conflicting symbol periods. For example, a symbol period may be configured for downlink for a first UE, where the same symbol period is configured for uplink for a second UE. In some cases, uplink transmission of the first UE may cause interference to downlink reception at the second UE. This type of interference may be referred to as cross-link interference (CLI).

To manage CLI, an aggressor UE may transmit a signal, such as a reference signal, which is received and measured by the victim UE. The victim UE may measure the signal to estimate the CLI strength. In some cases, the measurement may include determining the reference signal received power (RSRP), reference signal received quality (RSRQ), or received signal strength indicator (RSSI) of the transmitted signal. Each cell may also independently configure a subcarrier spacing (SCS) for uplink communications and downlink communications for each UE. Based on the independent and separate configuration of SCS, the uplink SCS of the aggressor UE may be different from the downlink SCS of the victim UE. For example, a first base station serving the aggressor UE may configure the aggressor UE with an uplink SCS value of 15 kHz and a second base station serving the victim UE may configure the victim UE with a downlink SCS value of 30 kHz. If the uplink SCS configuration of the aggressor UE does not match the downlink SCS configuration of the victim UE, the victim UE may be unable to successfully receive the signal and perform the measurement. In such cases, current techniques may fail to detect or accurately measure reference signals.

To account for difference in SCS at the victim and aggressor UEs, the base station(s) serving the UEs may configure the UEs with parameters associated with transmitting (e.g., for aggressor UEs) or receiving (e.g., for victim UEs) CLI measurement signals. The aggressor UEs may apply the transmission parameters when generating the CLI measurement signal, and the victim UEs may apply the reception parameters when receiving or measuring the CLI measurement signal. Then, the transmission configuration of the aggressor UE may be compatible with the reception configuration at the victim UE. Generally, the UEs may be configured to use techniques such that subcarriers for uplink used by the aggressor UE to transmit the signal correspond to subcarriers for downlink of the receiver. Further, the signal symbol may be repeated for the higher SCS UE to match the symbol duration of the lower SCS UE. The signals from the aggressor UEs may fit into the frequency domain and time domain resource grid of the victim UEs as though the signals are associated with the same SCS.

Which parameters are adjusted and at which UE (e.g., the aggressor UE or victim UE) may be based on whether the uplink SCS of the aggressor UE is greater than or less than the downlink SCS of the victim UE. For example, if the uplink SCS is greater than the downlink SCS, the victim UE may apply a receiver frequency domain comb factor and a receiver frequency domain comb offset based on (e.g., proportional to) a ratio of the uplink SCS to the downlink SCS. Additionally, or alternatively, the aggressor UE may adjust a number of symbols in the CLI measurement signal and perform a linear phase shift to the waveform of the signal based on (e.g., proportional to) a ratio of the uplink SCS to the downlink SCS. If the downlink SCS is greater than the uplink SCS, the aggressor UE may apply a transmitter frequency domain comb factor and a transmitter frequency domain comb offset proportional to a ratio of the downlink SCS to the uplink SCS. Additionally, or alternatively, the victim UE may adjust a number of symbols for reception and perform a linear phase shift to received signals, where the number of measurement symbols and the amount of phase shifting may be proportional to a ratio of the downlink SCS to the uplink SCS.

In some cases, the transmission and reception parameters (e.g., receiver comb factor, receiver comb offset, transmitter comb factor, transmitter comb offset, number of measurement symbols, amount of phase shifting, or any combination thereof) may be applied for situations where the CLI measurements are based on RSRP or another signal received power-type CLI measurement procedure. In some other examples, RSRP-based CLI measurements may not be used if the uplink SCS of the aggressor UE is different from the downlink SCS of the victim UE. For example, RSRP-based CLI measurements may only be supported if the uplink SCS of the transmitter is the same as the downlink SCS of the receiver. In some cases, if the uplink SCS is different from downlink SCS, the aggressor and victim UEs and their corresponding base stations may use RSSI-based CLI measurements (e.g., without using RSRP or RSRQ based CLI measurements). In some cases, if the cells are using RSSI-based CLI measurements (e.g., or some other type of total received power-type CLI measurement procedure) and the victim UE has a downlink SCS smaller than an uplink SCS of the aggressor UE, then the corresponding symbols in the slot at the transmitter may be configured as uplink symbols. In some cases, CLI measurement may not be supported if the uplink SCS of the aggressor UE and the downlink SCS of the victim UE are different.

Aspects of the disclosure are initially described in the context of a wireless communications system. Aspects of the disclosure are further illustrated by and described with reference to apparatus diagrams, system diagrams, and flowcharts that relate to subcarrier spacing for UE-to-UE cross link interference measurement.

FIG. 1 illustrates an example of a wireless communications system 100 that supports subcarrier spacing for UE-to-UE cross link interference measurement in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

To manage CLI, an aggressor UE 115 may transmit a signal, such as a reference signal, which is received and measured by a victim UE 115. The victim UE 115 may measure the signal to estimate the CLI strength. In some cases, the measurement may include determining the RSRP, RSRQ, or RSSI of the transmitted signal. A cell may also independently configure a SCS for uplink communications and downlink communications for each UE 115. Based on the independent and separate configuration of SCS, the uplink SCS of the aggressor UE 115 may be different from the downlink SCS of the victim UE 115. For example, a first base station 105 serving the aggressor UE 115 may configure the aggressor UE 115 with an uplink SCS value of 15 kHz and a second base station serving the victim UE 115 may configure the victim UE 115 with a downlink SCS value of 30 kHz. If the uplink SCS configuration of the aggressor UE 115 does not match the downlink SCS configuration of the victim UE 115, the victim UE 115 may be unable to successfully receive the signal and perform the measurement. In such cases, current techniques may fail to detect reference signals.

To account for difference in SCS at the victim and aggressor UEs 115, the base station(s) 105 serving the UEs 115 may configure the UEs 115 with a configuration including one or more parameters associated with transmitting (e.g., for aggressor UEs 115) or receiving (e.g., for victim UEs 115) CLI measurement signals. The aggressor UEs 115 may apply the transmission parameters when generating the CLI measurement signal, and the victim UEs 115 may apply the reception parameters when receiving or measuring the CLI measurement signal. Then, the transmission configuration of the aggressor UE 115 may be compatible with the reception configuration at the victim UE 115. Generally, the UEs 115 may be configured to use techniques such that subcarriers for uplink used by the aggressor UE 115 to transmit the signal correspond to subcarriers for downlink of the receiver. Further, the signal symbol may be repeated for the higher SCS UE 115 to match the symbol duration of the lower SCS UE 115. The signals from the aggressor UEs 115 may fit into the frequency domain and time domain resource grid of the victim UEs 115 as though the signals are from the same serving cell and using the same TDD configuration.

Figure 2:
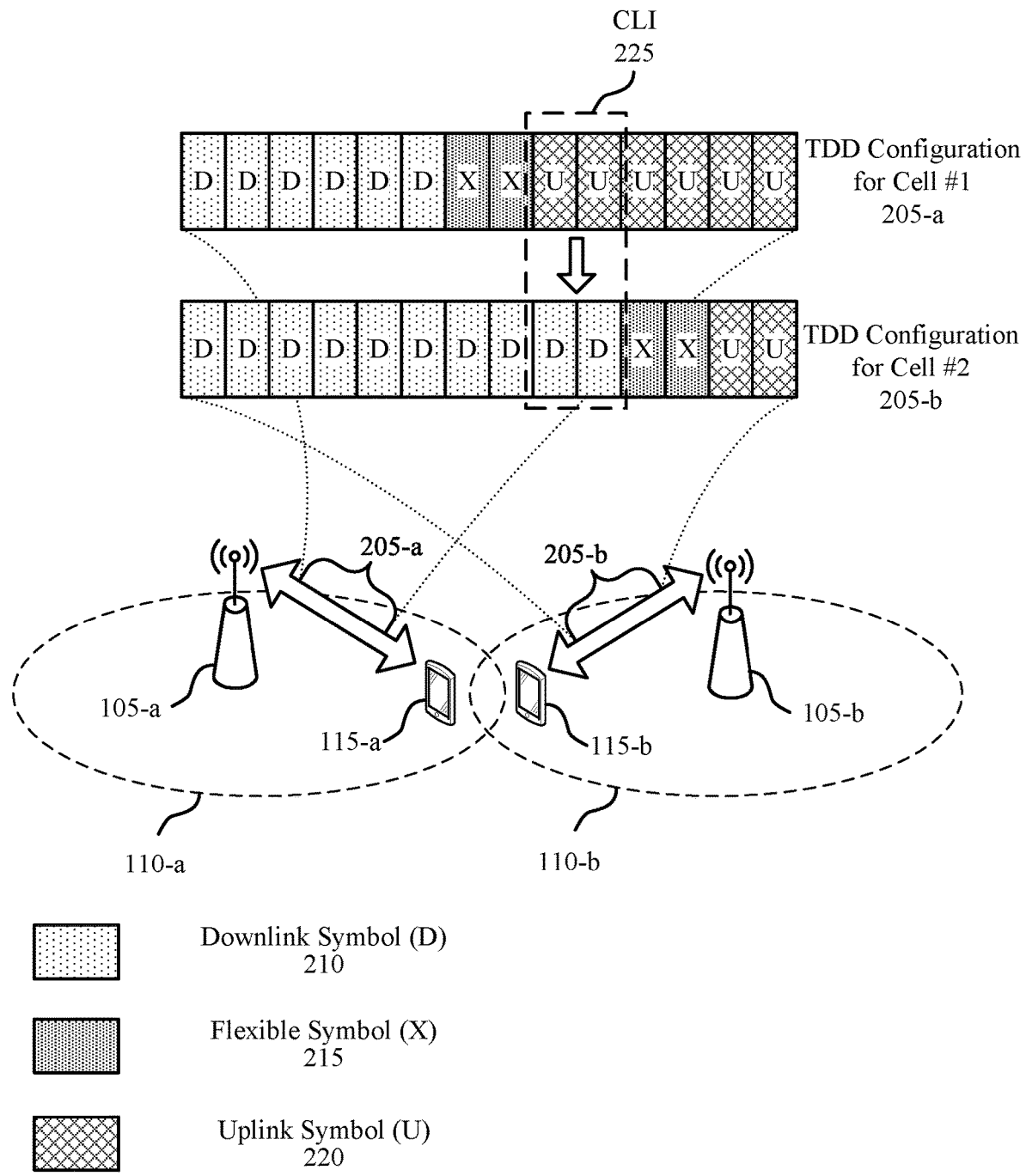
FIG. 2 illustrates an example of a wireless communications system that supports subcarrier spacing for UE-to-UE cross link interference measurement in accordance with aspects of the present disclosure.

FIG. 2 illustrates an example of a wireless communications system 200 that supports subcarrier spacing for UE-to-UE cross link interference measurement in accordance with aspects of the present disclosure. In some examples, wireless communications system 200 may implement aspects of wireless communication system 100. In some examples, the wireless communications system 200 may implement aspects of wireless communication system 100. The wireless communications system 200 may include UE 115 *a* and UE 115 *b*, which may each be an example of a UE 115 as described herein. The wireless communications system 200 may include UE 115-*a* and UE 115-*b*, which may each be an example of a UE 115 as described herein. The wireless communications system 200 may also include base station 105-*a* and base station 105-*b*, which may each be an example of a base station 105 as described herein. Base station 105-*a* and base station 105-*b* may each be an example of a small cell. The base stations 105 may each be associated with a cell which provides wireless communications with the base station 105 within a coverage area 110. For example, base station 105-*a* may provide a cell within coverage area 110-*a*, and base station 105-*b* may provide a cell within coverage area 110-*b*.

The wireless communications system 200 may employ TDD communications, where a wireless communications channel is used for both uplink transmissions and downlink transmissions. Each cell may configure a TDD configuration 205 for the cell. For example, the first cell of base station 105-*a* may use a first TDD configuration 205-*a*, and the second cell of base station 105-*b* may use a second TDD configuration 205-*b*. UEs 115 in these cells may communicate with the base station 105 based on the corresponding TDD configuration 205 for the cell. For example, a slot of a TDD configuration 205 may include symbol periods for downlink symbols 210, flexible symbols 215, or uplink symbols 220, or any combination thereof. The base station 105 may transmit a downlink transmission in a downlink symbol 210, and the UE 115 may transmit an uplink transmission in an uplink symbol 220. Flexible symbols 215 may, in some cases, be used as guard periods between the uplink transmissions and downlink transmissions. A guard period may prevent inter-symbol interference or may provide time for a UE 115 to adjust radio frequency hardware. In some cases, a flexible symbol 215 may be dynamically reconfigured to either a downlink symbol 210 or an uplink symbol 220.

The base stations 105 may dynamically change the TDD configurations 205. In an example, the traffic in the first cell may shift toward being more uplink-heavy, so the first TDD configuration 205-*a* of the first cell may change to using a slot configuration which has more uplink symbol periods. In some cases, a TDD configuration 205 may be dynamically indicated to UEs in the cell by an SFI in DCI. The DCI conveying the SFI may be transmitted in one of the first few downlink symbols 210 of a slot and may convey a TDD configuration 205 for one or more additional slots. That is, for the illustrated slot, the SFI including the TDD configuration 205 may be received in the slot, or in a previous slot. Additionally or alternatively, the TDD configuration 250 may be semi-statically configured (e.g., included in an RRC configuration) by higher layer signaling, such as RRC signaling.

In some cases, different TDD configurations 205 used by neighboring cells may lead to conflicting transmission directions for some symbol periods of a slot. For example, the 9th and 10th symbol periods of the slot shown may have conflicting directions for the first TDD configuration 205-*a* and the second TDD configuration 205-*b*. TDD configuration 205-*a* may have uplink symbols 220 configured when TDD configuration 205-*b* has downlink symbols 210 configured. Therefore, UE 115-*a* in the first cell may be configured to transmit an uplink transmission while UE 115-*b* in the second cell is configured to receive a downlink transmission. The first cell and the second cell may be neighboring cells, and UE 115-*b* and UE 115-*a* may be near each other at the edge of their respective cells. In some cases, the uplink transmission of UE 115-*a* may cause interference to reception of the downlink transmission at UE 115-*b*. This type of interference may be referred to as UE-to-UE CLI, shown by CLI 225 at the conflicting symbol periods. Generally, differing TDD configurations 205 may result in UE-to-UE CLI 225 when an uplink symbol of one cell collides with a downlink symbol of another nearby cell. CLI 225 may occur near or between cell edge UEs of nearby cells. The UE 115 transmitting the uplink signal (e.g., UE 115-*a* here) may be referred to as the aggressor UE 115, and the UE 115 which is receiving the affected downlink transmission (e.g., UE 115-*b* here) may be referred to as the victim UE 115. In some cases, the CLI 225 may occur between one or more aggressor UEs 115 and one or more victim UEs 115

To manage the CLI 225 in the wireless communications system 200, the aggressor UE 115 may transmit a signal during one or more symbol periods in which CLI 225 may occur. The victim UE 115 may be configured to receive and measure the CLI measurement signal during those symbol periods. The CLI measurement signal may be, for example, a reference signal such as an SRS. In some cases, an SRS may be transmitted across a wide bandwidth (e.g., up to or including the entire cell bandwidth). SRS may not be associated with an uplink grant. For example, SRS may be transmitted in different resources than resources granted for uplink shared channel transmissions. In some conventional wireless systems, an SRS may be transmitted by a UE 115 to a base station 105. The base station 105 in these conventional systems may measure the SRS to determine which portions of a frequency bandwidth provide the strongest channel quality or conditions for the UE 115. The base station 105 may use these measurements when configuring resources for the UE 115. In some other examples, the CLI measurement signal may be, for example, a demodulation reference signal (DMRS).

In this example, UE 115-*a* may transmit a CLI measurement signal in the 9th and 10th symbol periods of the slot (e.g., corresponding to uplink symbols 220), which are scheduled to cause the CLI 225. UE 115-*b* may receive the CLI measurement signal (e.g., in the corresponding downlink symbols 210) and perform a measurement procedure using the CLI measurement signal. UE 115-*b* may transmit a measurement report to base station 105-*b* including measurements of the CLI measurement signal (e.g., a signal received power-type measurement such as RSRP or RSRQ, a total received power-type measurement such as RSSI). The configurations for transmitting the CLI measurement signal at the aggressor UE 115 and receiving and measuring the CLI measurement signal at the victim UE 115 may be determined and configured at the corresponding serving cells for the aggressor and victim UEs 115. For example, base station 105-*a* may transmit a first configuration to UE 115-*a*, and UE 115-*a* may transmit the CLI measurement signal based on the configuration. Base station 105-*b* may transmit a second configuration to UE 115-*b*, and UE 115-*b* may monitor for, receive, and measure the CLI measurement signal based on the second configuration.

The network may use the measurement report to determine whether the UE-to-UE CLI 225 is causing too much performance degradation at UE 115-*b* or whether UE 115-*b* can handle more interference. In some cases, the network may determine that UE 115-*b* can handle more interference from the CLI 225 and implement more aggressive TDD configurations 205 for one or both of the cells. The more aggressive TDD configurations 205 may introduce more overlapping symbols and more CLI 225, but possibly higher throughput. In some cases, the network may determine that the interference from the CLI 225 affects the downlink reception at UE 115-*b* too much, and the network may implement less aggressive TDD configurations 205 for one or both of the cells. The less aggressive TDD configurations 205 may reduce the number of overlapping symbols and reduce the UE-to-UE CLI 225, which may improve channel conditions for the victim UE 115. In some examples, the determinations may be based on a threshold or a tolerance. For example, if the channel quality, RSRP, RSSI, RSRQ, or another measurement metric, at the victim UE 115 is above a threshold, the serving cell of the victim UE 115 may implement a less aggressive TDD configuration 205. In some cases, one or more of the base stations 105 may make the determination of whether to use a more aggressive or less aggressive TDD configuration 205. Additionally, or alternatively, a control unit (CU), a gNB, or some other entity may make the determination for the one or more TDD configurations 205 based on the measurements.

In some cases, either the victim UE 115 or the aggressor UE 115 may measure the CLI strength. For example, UE 115-*b*, as the victim, may measure signals transmitted by UE 115-*a*, the aggressor. Additionally, or alternatively, UE 115-*a* may measure signals transmitted by UE 115-*b*. Based on channel reciprocity of the TDD channel, the measurement taken by UE 115-*a* may also reflect aggressor-to-victim interference strength.

As described herein, the CLI measurement may be RSRP, RSRQ, or RSSI measurements, or a combination of these measurements. RSRP may measure the received reference signal power of a configured reference signal resource. RSSI may indicate the total received power (e.g., including thermal noise, interference, signal strength, etc.) measured in select OFDM symbols. The measurements may be based on a CLI measurement signal at different levels. For example, the measurements may be cell-specific, where all UEs 115 in a cell transmit the same CLI measurement signal. In some cases, the measurements may be group-specific, where a subset of UEs 115 in the cell transmit the same CLI measurement signal. In some examples, the measurements may be UE-specific, where each UE 115 in the cell transmits a distinct CLI measurement signal unique to the UE 115. This may provide different levels of granularity for determining CLI strength, tolerance, and impact.

In some cases, a base station 105 may configure a UE 115 with an SCS. SCS may be configured on a per-cell or per-BWP basis. If there is an SCS configuration each of a cell and a BWP of the cell, the BWP configuration may override the cell-specific configuration. In some cases, the base station 105 may configure SCS separately for uplink and downlink transmissions, and the values may be different from each other (e.g., SCS may be 15 kHz for uplink transmission and 30 kHz for downlink transmissions). Some examples of SCS values (e.g., for NR SCS) may include 15 kHz, 30 kHz, 60 kHz, 120 kHz, or 240 kHz, though some other value may also be used. In some cases, symbol duration, cyclic prefix (CP) length, or both, may be inversely proportional to a given SCS. For example, the symbol duration for a UE 115 using an SCS of 15 kHz may be the twice as long as the symbol duration for a UE 115 using an SCS of 30 kHz.

In cases where an uplink SCS at an aggressor UE 115 is different from a downlink SCS at a victim UE 115, the transmitter and receiver may adjust their transmission configuration and receiving configuration, respectively, for the CLI measurement signaling. Using the described techniques, the transmitting, aggressor UE 115 or the receiving, victim UE 115, or both, may adjust frequency domain configurations such that subcarriers for uplink transmissions correspond to subcarriers for downlink reception. In some cases, the transmitter may use certain uplink subcarriers by applying a transmitter comb factor and a transmitter comb offset. Additionally, or alternatively, the receiver may monitor on certain downlink subcarriers by applying a receiver comb factor and a receiver comb offset.

In some cases, the UE 115 with the smaller SCS may make modifications to the comb factor and, if configured, comb offset. For example, if the uplink SCS of the aggressor UE 115 is half that of the downlink SCS of the victim UE 115, the aggressor UE 115 may apply a transmitter comb factor or a transmitter comb offset, or both, to transmit the signal once every other subcarrier. An example of this may be described in more detail in FIG. 3A. In another example, if the uplink SCS of the aggressor UE 115 is twice that of the downlink SCS of the victim UE 115, the victim UE 115 may use a receiver comb factor and, if configured, a receiver comb offset to adjust the uplink subcarriers such that the victim UE 115 expects the signal transmission on every other configured subcarrier. An example of this may be described in more detail in FIG. 4A.

In some cases, the UEs 115 may also adjust time domain configurations for the CLI measurements. For example, a reference signal symbol may be repeated at the UE 115 with the higher SCS to match a symbol duration of the UE 115 with a lower SCS. If, for example, the symbol duration of the aggressor UE 115 is twice that of the victim UE 115, the victim UE 115 may be configured to receive and measure two symbols. The victim UE 115 may be indicated that there is phase continuity between the two symbols. This example may be described in more detail in FIG. 3B. In another example, if the symbol duration of the aggressor UE 115 is half that of the victim UE 115, the aggressor UE 115 may then transmit two reference signals in the span of the one victim UE 115 symbol period. This may be described in more detail in FIG. 4B. In some cases, a phase offset may be applied at the UE 115 with the higher SCS to match a phase of the UE 115 with the lower SCS.

In some cases, the frequency domain and time domain configuration adjustments may be based on a ratio between the larger SCS and the smaller SCS. In some cases, the aggressor and victim UEs 115 may each receive a parameter including the ratio from serving base stations 105. For example, base station 105-*a* may provide the parameter to UE 115-*a*, and base station 105-*b* may provide the parameter to UE 115-*b*. For instance, if the uplink SCS of the aggressor UE 115 is greater than the downlink SCS of the victim UE 115, the serving base stations 105 of the aggressor and victim UEs 115 may transmit an indicator of a ratio of the uplink SCS to the downlink SCS to the aggressor and victim UEs 115. Alternatively, if the uplink SCS of the aggressor UE 115 is less than the downlink SCS of the victim UE 115, the base stations may instead transmit an indicator of a ratio of the downlink SCS to the uplink SCS. In either case, the receiver comb factor, receiver comb offset, transmitter comb factor, transmitter comb factor, OFDM measurement symbols, phase offset, or a combination thereof may be determined based on the ratio. In some cases, the ratio may be determined based on the base stations 105 exchanging TDD configurations, including SCS information, related to their served UEs 115.

In an example, if the uplink SCS of the aggressor UE 115 is 15 kHz and the downlink SCS of the victim UE 115 is 30 kHz, the ratio, N, may be equal to 2. If, instead, the uplink SCS of the aggressor UE 115 is 30 kHz, and the downlink SCS of the victim UE 115 is 15 kHz, the ratio may still be equal to 2. Generally, the ratio may be equal to the larger SCS divided by the smaller SCS. In another example, if the uplink SCS of the aggressor UE 115 is 30 kHz and the downlink SCS of the victim UE 115 is 120 kHz, the ratio, N, may then be equal to 4. When applying the ratio to the frequency domain configurations, the UE 115 with the smaller SCS may use a comb factor and, if configured, comb offset which is N times the comb factor and comb offset for the UE 115 with the larger SCS. The ratio may also be applied to the time domain configurations, where the UE 115 with the larger SCS may either transmit N CLI measurement signals or monitor for a CLI measurement signal spanning N CLI measurement signals.

In cases where CLI measurement is based on RSRP, a UE 115 may receive one or more reference signals and may attempt to perform coherent processing of the one or more reference signals. For example, the UE 115 may perform channel estimation and filtering for noise reduction. In cases where CLI measurement is based on RSSI, a UE 115 may measure the total power of all received signals, and therefore may perform the measurement even without receiving a reference signal or coherently processing reference signals. As such, application of the described transmission and reception parameters may generally be associated with RSRP-based CLI measurements, though RSSI-based CLI measurements may include applying the parameters in some cases as well.

The type of measurement for CLI management may be based on a relationship of the uplink SCS and the downlink SCS. For example, RSRP-based CLI measurement may, in some cases, only be used if the uplink SCS of the transmitter is the same as the downlink SCS of the receiver. In some cases, RSSI-based CLI measurement may be used for any configuration of uplink SCS and downlink SCS (e.g., RSSI-based CLI measurements may be used if the uplink SCS is smaller, larger, or the same as the downlink SCS). In some cases of RSSI-based CLI measurement where a victim UE 115 has a smaller SCS and/or larger symbol duration, each symbol of the aggressor UE 115 corresponding to a downlink symbol for receiving the measurement signal may be configured as an uplink symbol 220, such that the measurement result is unbiased and/or less biased than if some of the symbols were downlink symbols 210 or flexible symbols 215. In some cases, if the reference subcarrier spacing is larger than the subcarrier spacing of the configured active downlink bandwidth part, the network may configure a start position and number of symbols as a multiple of the reference subcarrier spacing divided by the active bandwidth part subcarrier spacing. In some other examples, the wireless communications system 200 may not support CLI measurement if the downlink SCS of a victim UE 115 and the uplink SCS of an aggressor UE 115 are different.

In some cases, a device receiving a CLI SRS may refrain from performing a CLI measurement on the CLI SRS. In some cases, a UE 115 may not be required to measure SRS when the subcarrier spacing of the transmitting UE 115 is different from the subcarrier spacing of the downlink active bandwidth part. For example, RSRP-based CLI measurements may be supported if the uplink subcarrier spacing of the transmitter is the same as the downlink subcarrier spacing of the receiver. In some examples, the subcarrier spacing for CLI-measurement resource configuration may be the same or different from the SCS of the active bandwidth part. In some cases, RSSI-based CLI measurements may be supported when the uplink resource of the transmitter and the downlink resource of the receiver have different subcarrier spacings. For example, a base station 105 or a UE 115 may refrain from performing an RSRP-based CLI measurement if the uplink SCS is different from the downlink SCS. In some cases, if the receiving device refrains from performing an RSRP-based CLI measurement, the receiving device may use another type of CLI measurement (e.g., RSSI). In some examples, CLI measurements between UEs may not be performed if the transmitter and the receiver do not have the same SCS.

Configuring the signals from an aggressor UE 115 to match the time domain (e.g., symbol durations) and frequency domain (subcarriers) of a resource grid of a victim UE 115 may provide enhanced signal reception and measurement at the victim UE 115. This may lead to efficient CLI management for the wireless communications system 200. Generally, the techniques described herein configure the transmissions for CLI measurement from the aggressor UEs 115 to fit into the resource grid of the receiving, victim UEs 115 as though both the transmitter and receiver were configured with the same SCS. Therefore, the CLI measurement may be based on the normal SCS configurations for the victim UE 115. Because of this, UEs 115 may perform the CLI measurement without being configured for a dedicated measurement gap just for transmitting or receiving the CLI measurement signals. The UEs 115 therefore may maintain the same SCS configuration and not be configured to switch to a different SCS configuration to perform the CLI measurement. The UEs 115 may quickly transition from control and data signaling with a serving cell to performing the CLI measurement, without waiting for a measurement gap to be configured and then waiting for the configured measurement gap to start. For example, the receiving UE 115 may receive the CLI measurement signals in symbols that are contiguous with symbols used for control or data signaling.

Although illustrated in FIG. 2 as being between UEs served by different cells associated with different base stations, CLI may occur within a single cell. For example, the operations of base station 105-a and base station 105-b may actually be performed by a single base station 105 to manage CLI which occurs within the cell provided by the single base station 105. This may occur based on the single base station 105 configuring different SCS configurations for UEs 115 within the cell (e.g., different uplink and downlink SCS).

In some cases, the signal for CLI measurement may be multiplexed with other signals or channels (e.g., control or data signaling). In some examples, the multiplexing may be based on resource element-level rate matching of uplink shared channels and downlink shared channels around the CLI signals. In some cases, signals from different cells, UE groups, UEs 115, or any combination thereof, may be multiplexed, even if the signals from these different sources have different SCS configurations. This may improve the efficiency of resource usage. In some examples, the UEs 115 may instead just switch to a different SCS and use a configured measurement gap.

Some techniques described herein may support CLI signal measurement without configuring a dedicated measurement gap at the receiving, victim UE 115. For example, for RSRP-based CLI measurements, if the uplink SCS of the aggressor UE 115 and the downlink SCS of the victim UE 115 are different, the aggressor UE 115 and the victim UE 115 may apply the transmission parameters and reception parameters to adjust their respective time or frequency domain configurations as described herein. In some cases, implementing CLI measurement at the UEs 115 with so few restrictions may increase UE complexity. Therefore, in some cases, the CLI measurement configurations may be based on some conditions. For example, in some other examples, RSRP-based CLI measurement may only be supported if the uplink SCS of the aggressor UE 115 is the same as the downlink SCS of the victim UE 115. In some cases, these two techniques may be implemented when a dedicated measurement gap is not configured at the receiving, victim UE 115 for CLI RSRP measurements.

In some cases, when a dedicated measurement gap is not configured at the receiving, victim UE 115, and the CLI measurement procedure is based on RSSI measurement, the corresponding symbols in the transmitter's slot may be all configured as uplink symbols so that the measurement result is not biased. For example, for RSSI-based measurements at a receiver UE with smaller subcarrier spacing and larger symbol duration, the corresponding symbols in the transmitter's slot may be all uplink. In some examples, configuring a dedicated measurement gap may be avoided for CLI RSSI measurement regardless of whether the uplink SCS of the aggressor UE 115 and the downlink SCS of the victim UE 115 are the same or different. In some cases, CLI measurement between UEs 115 may only be supported (e.g., without configuring a dedicated CLI measurement gap at the receiver) if the transmitter and the receiver use the same SCS. In some cases, a dedicated measurement gap may be configured at least for CLI RSRP measurement between UEs 115 that have different SCS configurations. In the dedicated measurement gap, the victim UE 115 can switch to a different SCS to perform the measurement of the CLI measurement signal. In some cases, configuring the dedicated measurement gap may be based on the type of CLI measurement procedure, the first SCS, and the second SCS.

Figure 3A:
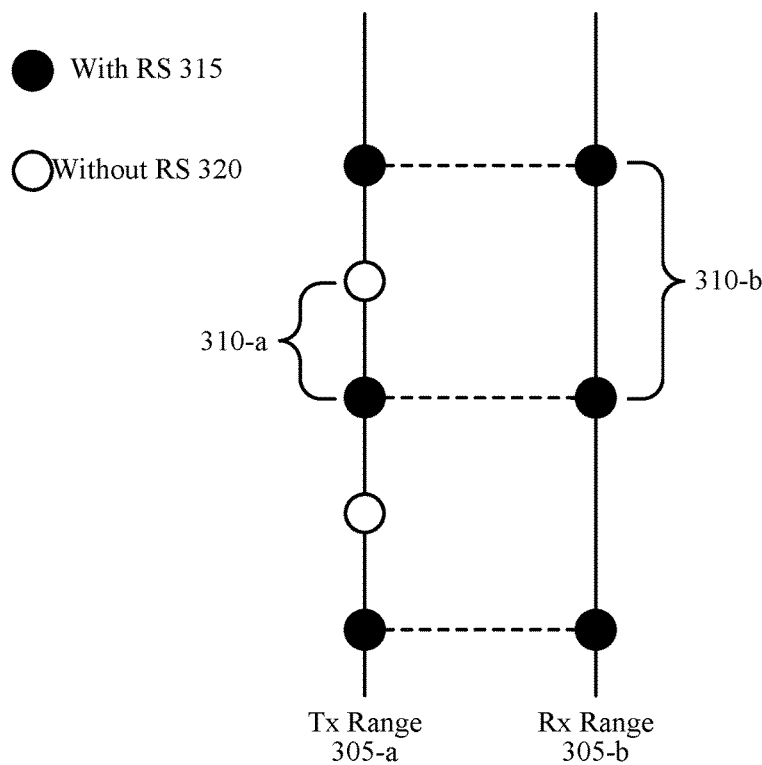
FIGS. 3A through 4B illustrate examples of time domain configurations and frequency domain configurations that support subcarrier spacing for UE-to-UE cross link interference measurement in accordance with aspects of the present disclosure.

FIG. 3A illustrates an example of a frequency domain configuration 300-a that supports subcarrier spacing for UE-to-UE cross-link interference measurement in accordance with aspects of the present disclosure. In some examples, frequency domain configuration 300-a may be implemented by aspects of wireless communications systems 100 and 200. Frequency domain configuration 300-a may be implemented by base stations 105 and UEs 115 as described with reference to FIGS. 1 and 2.

Frequency domain configuration 300-a may include a transmit frequency range 305-a and a receive frequency range 305-b. Transmit frequency range 305-a may be associated with an aggressor UE 115 and receive frequency range 305-b may be associated with a victim UE 115. Each frequency range 305 may be associated with a SCS 310. For instance, transmit frequency range 305-a may be associated with an uplink SCS 310-a and receive frequency range 305-b may be associated with a downlink SCS 310-b. The frequency domain configuration 300-a may correspond to an example where the uplink SCS 310-a of the aggressor UE 115 is smaller than the downlink SCS 310-b of the victim UE 115. In this example, the ratio of the larger SCS to the smaller SCS is equal to 2.

Each subcarrier of the frequency ranges 305 may either be a reference signal subcarrier 315 or a non-reference signal subcarrier 320 (e.g., a subcarrier carrying a null symbol). Each subcarrier of receive frequency range 305-b may be a reference signal subcarrier 315. A determination of which subcarriers of transmit frequency range 305-a are reference signal subcarriers 315 and which are non-reference signal subcarriers 320 (e.g., null symbols) may be based on a transmitter comb factor and a transmitter comb offset. A transmitter comb factor of P may indicate that a reference signal is to be sent once every P subcarriers of transmit frequency range 305-a. For instance, in the present example, the reference signals may be transmitted once every 2 subcarriers. As such, the transmitter comb factor may be 2. A transmitter comb offset may determine, within a resource block, a starting subcarrier for reference signal transmission within the RB. For instance, a transmitter comb offset of Q may indicate that the first reference signal is to be sent in the Qth subcarrier of an RB. In some cases, the transmitter comb factor and the transmitter comb offset may be based on a ratio of the downlink SCS 310-b to the uplink SCS 310-a, a receiver comb factor, and a receiver comb offset used by the victim UE 115. For instance, if the ratio of downlink SCS 310-b to uplink SCS 310-a is N, then the transmitter comb factor may be equal to N multiplied by the receiver comb factor, and the transmitter comb offset may be equal to N multiplied by the receiver comb offset. In this example, the receiver comb factor may be equal to 1, so the configured transmitter comb factor may be 2, where N*1=2.

Figure 3B:
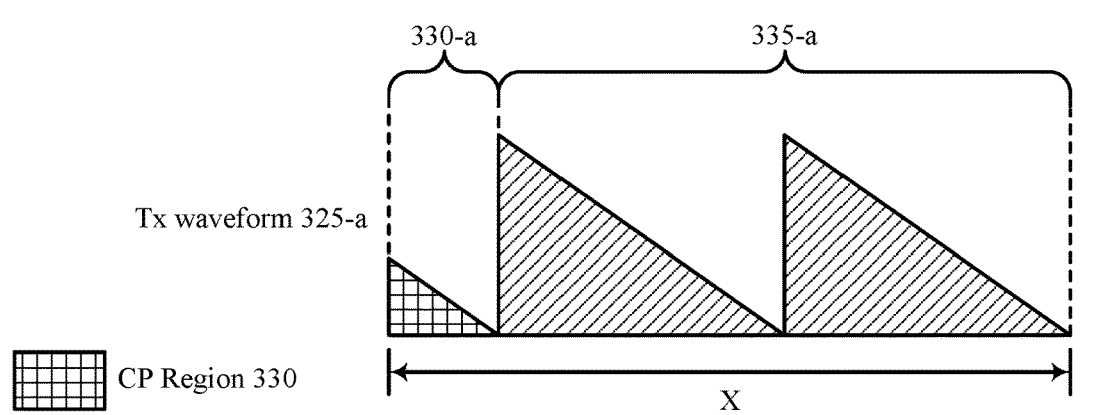
Figure 3B:
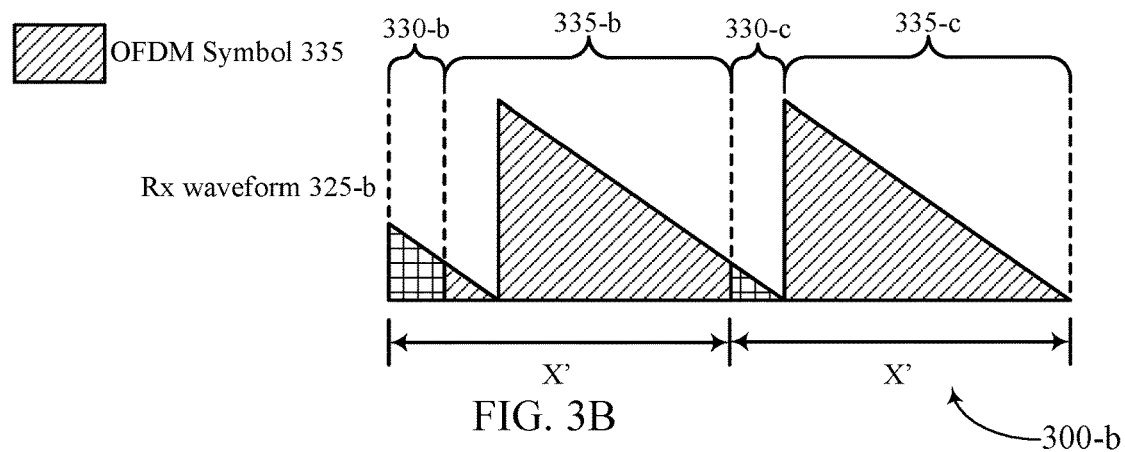

FIG. 3B illustrates an example of a time domain configuration 300-b that supports subcarrier spacing for UE-to-UE cross link interference measurement in accordance with aspects of the present disclosure. In some examples, time domain configuration 300-b may be implemented by aspects of wireless communications systems 100 and 200. Time domain configuration 300-b may be implemented by base stations 105 and/or UEs 115 as described with reference to FIGS. 1 and/or 2. An aggressor UE 115, a victim UE 115, and/or their corresponding base stations 105 may implement time domain configuration 300-b if an uplink SCS of the aggressor UE 115 is greater than a downlink SCS of the victim UE 115.

Time domain configuration 300-b may include a transmitter waveform 325-a and a receiver waveform 325-b. Transmitter waveform 325-a may be a waveform transmitted by an aggressor UE 115 and receiver waveform 325-b may be the same waveform received by a victim UE 115. Although channel modifications are not shown in the time domain configuration 300-b, it should be understood that receiver waveform 325-b may have one or more channel modifications or other deformations without deviating from the scope of the present disclosure. It should also be understood that the waveform is shown as a linear ramp for ease of illustration, and does not depict the actual OFDM symbol waveform.

Each waveform 325 may include one or more CP regions 330 and one or more OFDM symbol regions 335. The aggressor UE 115 may generate the transmitter waveform 325-a with a CP region 330-a and an OFDM symbol region 335-a. The duration of the transmitter waveform 325-a may correspond to a time X. The victim UE 115 may receive the receiver waveform 325-b. While the waveforms 325 may be similar in shape, the difference in symbol period duration (e.g., based on the difference in SCS) may affect how the victim UE 115 processes the CP regions 330 and OFDM symbol regions 335. For example, the victim UE 115 may identify CP region 330-b followed by OFDM symbol region 335-b, then CP region 330-c followed by OFDM symbol region 335-c. The duration of a CP and OFDM symbol in the transmit waveform may span X', where the ratio between X and X' is proportional to the ratio of the larger SCS to the smaller SCS. In this example, X may be twice as long as X'. Both the symbol duration without CP, and the CP itself, may be twice that of the corresponding durations at the receiver.

For every OFDM symbol configured to be transmitted by the aggressor UE 115, N OFDM symbols may be configured to be measured by the receiving, victim UE 115, where N is based on a ratio between the uplink SCS of the aggressor UE 115 and the downlink SCS of the victim UE 115. Here, the higher-valued SCS, corresponding to the downlink SCS 310-b of the victim UE 115, may be two times that of the lower-valued SCS, which corresponds to the uplink SCS 310-a of the aggressor UE 115. Therefore, the victim UE 115 may be configured to measure two OFDM symbols. These two OFDM symbols may correspond to OFDM symbol region 335-b and OFDM symbol region 335-c.

A serving base station 105 of the victim UE 115 may indicate to the victim UE 115 that there is phase continuity between adjacent symbols within every N OFDM symbols. The end of a first OFDM symbol and the beginning of a second OFDM symbol at the receiver may be continuous in phase. For example, there may not be a jump or change of phase in between the first OFDM symbol and the second OFDM symbol as long as the first and second OFDM symbol correspond to the same transmission from the aggressor UE 115. In some cases, the victim UE 115 may coherently combine the two symbols received in the receiver waveform 325-b. The waveform of the first symbol and the second symbol at the receiver may not be independent. For example, the second symbol may be a periodic extension of the first symbol. If, for example, a phase rotation is applied to the OFDM symbol region 335-c, the victim UE 115 may be able to add up the two OFDM symbols. The victim UE 115 may, for example, apply the symbol rotation to symbol region 335-c in the time domain, or compensate the OFDM symbol region 335-c in the frequency domain with a linear phase ramp. The victim UE 115 may then perform coherent combining of the two symbols.

Figure 4A:
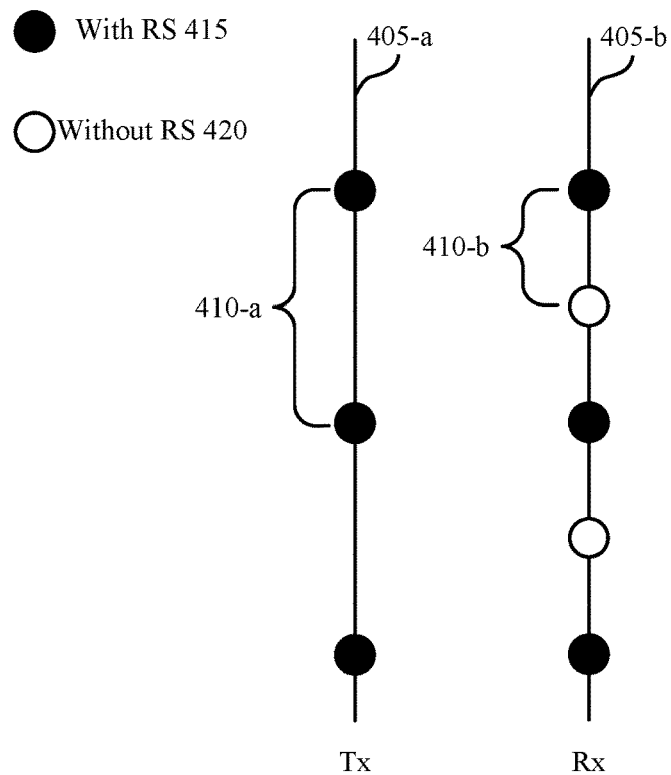

FIG. 4A illustrates an example of a frequency 305 domain configuration 400-a that supports subcarrier spacing for UE-to-UE cross link interference measurement in accordance with aspects of the present disclosure. In some examples, frequency domain configuration 400-a may implement aspects of wireless communications systems 100 and 200. Frequency domain configuration 400-a may be implemented by base stations 105 and/or UEs 115 as described with reference to FIGS. 1 and/or 2. An aggressor UE 115, a victim UE 115, and/or their corresponding base stations 105 may implement frequency domain configuration 400-a if an downlink SCS of the victim UE 115 is greater than an uplink SCS of the aggressor UE 115.

Frequency domain configuration 400-a may include a transmit frequency range 405-a and a receive frequency range 405-b. Transmit frequency range 405-a may be associated with an aggressor UE 115 and receive frequency range 405-b may be associated with a victim UE 115. Each frequency range 405 may be associated with a SCS 410. For instance, transmit frequency range 405-a may be associated with an uplink SCS 410-a and receive frequency range 405-b may be associated with a downlink SCS 410-b. The frequency domain configuration 300-a may correspond to an example where the uplink SCS 310-a of the aggressor UE 115 is greater than the downlink SCS 310-b of the victim UE 115. In this example, the ratio of the larger SCS to the smaller SCS is equal to 2.

Each subcarrier of frequency ranges 405 may either be a reference signal subcarrier 415 or a non-reference signal subcarrier 420 (e.g., a subcarrier not carrying a reference signal). All subcarriers of transmit frequency range 405-a may be reference signal subcarriers 415. A determination of which subcarriers of receive frequency range 405-b are reference signal subcarriers 415 and which are non-reference signal subcarriers 420 may depend on a receiver comb factor and/or receiver comb offset. A receiver comb factor of I may indicate that a reference signal is to be received once every I subcarriers of receive frequency range 405-b. For instance, in the present example, reference signals may be received once every 2 subcarriers. As such, the receiver comb factor may be 2. A receiver comb offset may determine, within a resource block, a starting subcarrier for reference signal reception within the RB. For instance, a receiver comb offset of J may indicate that the first reference signal is to be received in the Jth subcarrier of an RB. In some cases, the receiver comb factor and/or the receiver comb offset may depend on a ratio of the uplink SCS 410-a to the downlink SCS 410-b and a respective transmitter comb factor and/or transmitter comb offset (e.g., of the aggressor UE 115). For instance, if the ratio of uplink SCS 410-a to downlink SCS 410-b is N, then the receiver comb factor may be equal to N multiplied by the transmitter comb factor, and the receiver comb offset may be equal to N multiplied by the transmitter comb offset.

Figure 4B:
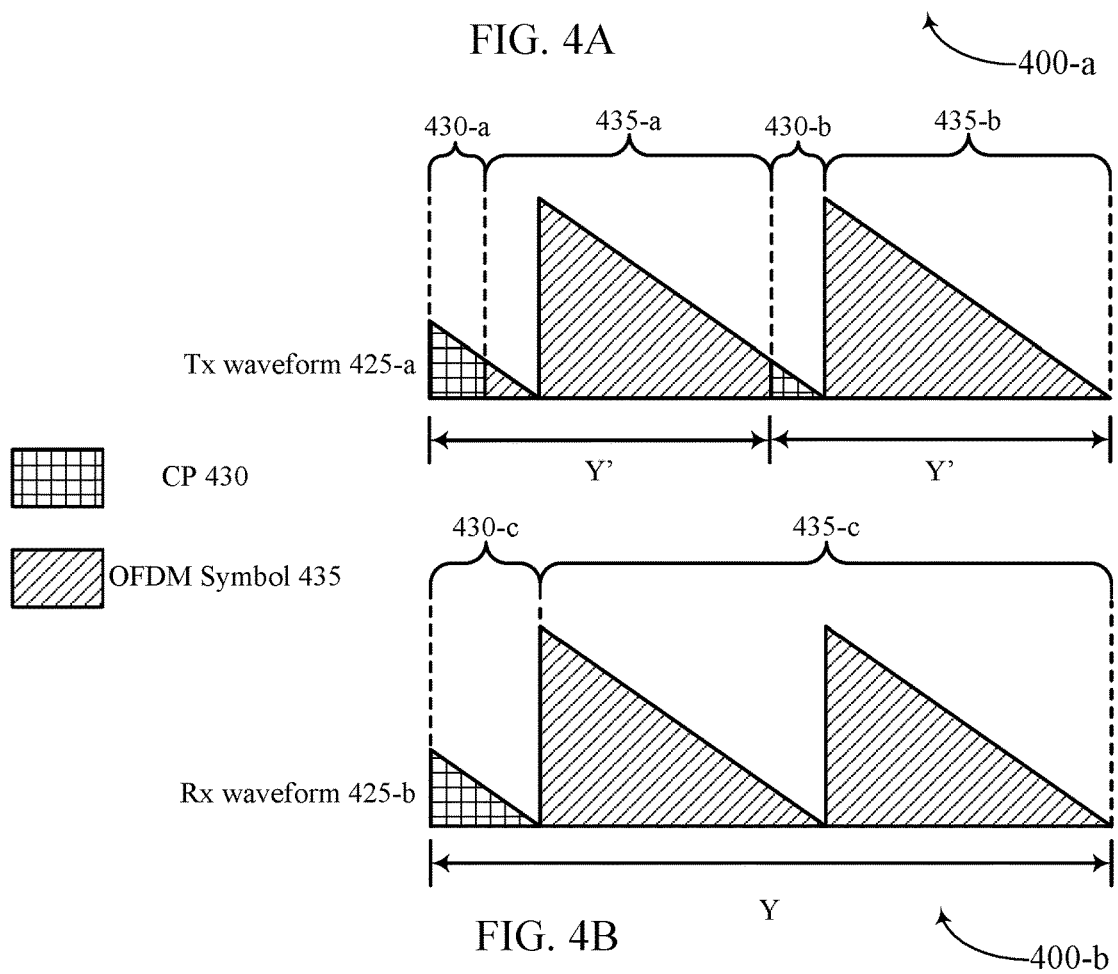

FIG. 4B illustrates an example of a time domain configuration 400-b that supports subcarrier spacing for UE-to-UE cross link interference measurement in accordance with aspects of the present disclosure. In some examples, time domain configuration 400-b may implement aspects of wireless communications systems 100 and 200. Time domain configuration 400-b may be implemented by base stations 105 and/or UEs 115 as described with reference to FIGS. 1 and/or 2. An aggressor UE 115, a victim UE 115, and/or their corresponding base stations 105 may implement time domain configuration 400-b if an uplink SCS of the aggressor UE 115 is less than a downlink SCS of the victim UE 115.

Time domain configuration 400-b may include a transmit waveform 425-a and a receive waveform 425-b. Transmit waveform 425-a may be a waveform transmitted by an aggressor UE 115 and receive waveform 425-b may be the same waveform received by a victim UE 115. Although channel modifications are not shown in the time domain configuration 400-b, it should be understood that receive waveform 425-b may have one or more channel modifications or other deformations without deviating from the scope of the present disclosure. It should also be understood that the waveform is shown as a linear ramp for ease of illustration, and does not depict the actual OFDM symbol waveform.

Each waveform 425 may include one or more CP regions 430 and one or more OFDM symbol regions 435. The transmitter waveform 425-a generated by the aggressor UE 115 may include a CP region 430-a followed by an OFDM symbol region 435-a, then a CP region 430-b followed by an OFDM symbol region 435-b. The receiver waveform 425-b may include a CP region 430-c followed by an OFDM symbol region 435-c. A single CP region 430 and a single OFDM symbol region 435 of the aggressor UE 115 transmitting the transmitter waveform 425-a may correspond to a time Y'. Meanwhile, a single CP region 430 and a single OFDM symbol region 435 of the victim UE 115 receiving receive waveform 425-b may span a time Y. The ratio between Y and Y' may be proportional to a ratio between the larger SCS (e.g., uplink SCS 410-a) and the smaller SCS (e.g., downlink SCS 410-b). In this example, Y may be twice as long as Y'.

The victim UE 115, with a shorter SCS and longer symbol duration, may be configured to measure one OFDM symbol for every N OFDM symbols configured to be transmitted by the aggressor UE 115, where N is a ratio between the larger SCS (e.g., uplink SCS 410-a) to the smaller SCS (e.g., downlink SCS 410-b). In this example, N may be equal to 2, so the victim UE 115 may be configured to measure one OFDM symbol while the aggressor UE 115 is configured to transmit two OFDM symbols. The serving base station 105 of the aggressor UE 115 may transmit an indicator to the aggressor UE 115, indicating that the aggressor UE 115 is to transmit N CPs and OFDM symbols. The aggressor UE 115 may then apply a phase shift to the N CPs and OFDM symbols such that the transmitter waveform 425-*a* is continuous in phase. For example, the next symbol, starting with CP region 430-*b*, has a phase as though it's an extension of the OFDM symbol region 435-*a*. This may correspond to a circular rotation of one or more symbols the OFDM symbol waveform, such that the end of the OFDM symbol is at the beginning of the OFDM symbol region 435. The circular rotation may be obtained by way of a time domain symbol rotation or a linear phase ramp in the frequency domain. In this way, the phase continuity may be maintained between adjacent symbols within every N OFDM symbols at the transmitter.

Figure 5:
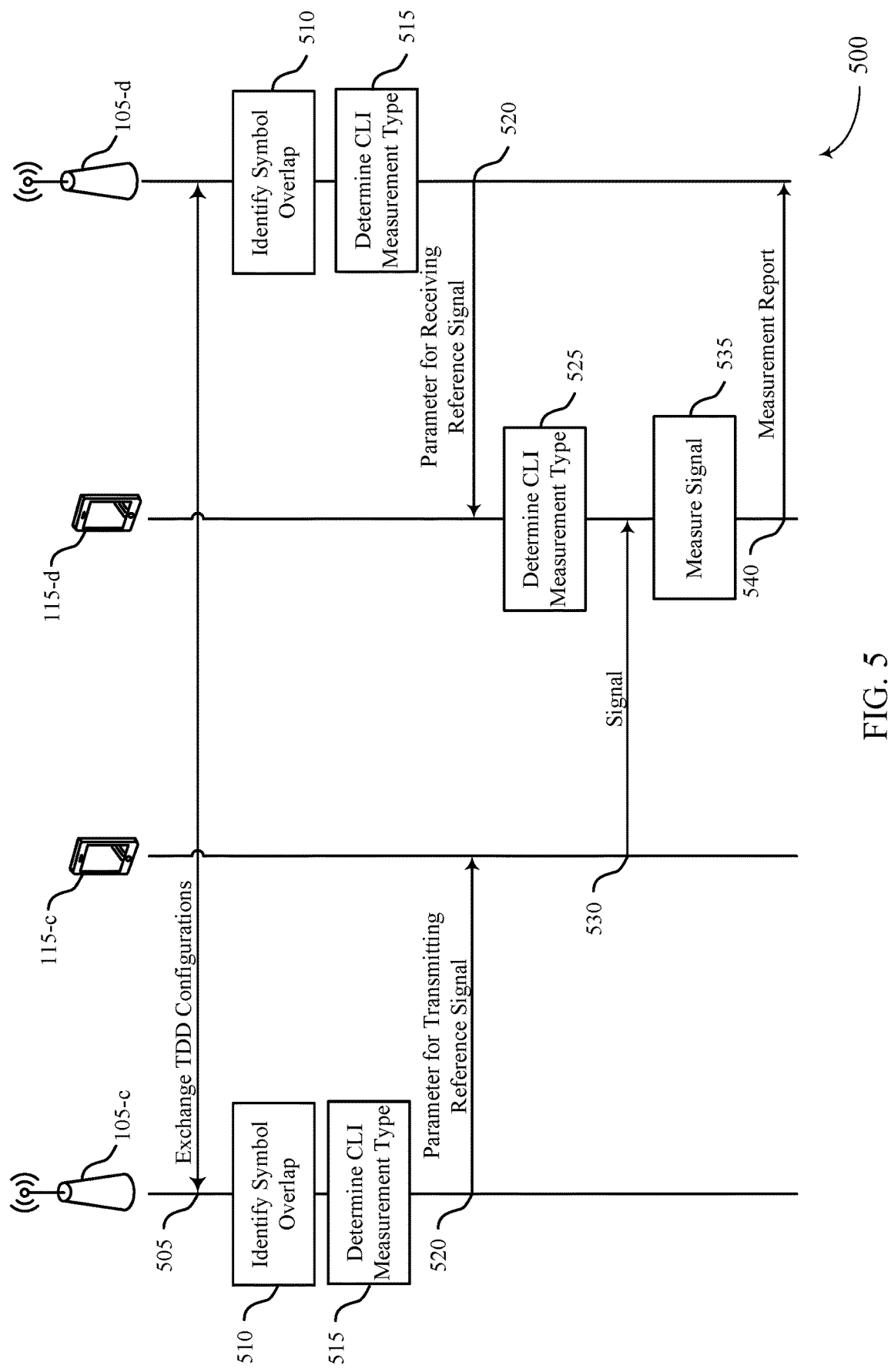
FIG. 5 illustrates an example of a process flow that supports subcarrier spacing for UE-to-UE cross link interference measurement in accordance with aspects of the present disclosure.

FIG. 5 illustrates an example of a process flow 500 that supports subcarrier spacing for UE-to-UE cross link interference measurement in accordance with aspects of the present disclosure. In some examples, process flow 500 may be implemented by aspects of wireless communication system 100. The process flow 500 may include UE 115-*c* and UE 115-*d*, which may each be an example of a UE 115 as described herein. The process flow 500 also includes base station 105-*c* and base station 105-*d*, which may each be an example of a base station 105 as described herein. In some cases, base station 105-*c* and base station 105-*d* may each be an example of a small cell. The base stations 105 may each be associated with a cell which provides wireless communications with the base station 105 within a coverage area. UE 115-*c* may be served by a first cell associated with base station 105-*c*. UE 115-*d* may be served by a second cell associated with base station 105-*d*. In some other examples, UE 115-*c* and UE 115-*d* may be served by the same cell. In some cases, base station 105-*c* and base station 105-*d* may actually be a single base station 105 serving both UEs. Alternative examples of the following may be implemented, where some steps are performed in a different order than described or are not performed at all. In some cases, steps may include additional features not mentioned below, or further steps may be added.

At 505, base station 105-*c* and base station 105-*d* may exchange TDD configurations. For example, the base stations 105 may exchange SCS information for their cells, configured BWPs, transmission directions, or a combination thereof. In some cases, the base stations 105 may also share mobility information of their served UEs 115. At 510, base station 105-*c* and base station 105-*d* may identify an overlap between a downlink symbol or a flexible symbol for UE 115-*c* and an uplink symbol for UE 115-*d*, where UE 115-*c* is configured for a first SCS and UE 115-*d* is configured for a second SCS.

At 515, base station 105-*c* may determine a type of CLI measurement, or type of CLI measurement procedure, to be performed by UE 115-*c*. Base station 105-*d* may determine a type of CLI measurement to be performed by UE 115-*d*. Both base stations 105 may determine the same type of CLI measurement, such that the UEs 115 perform the same type of measurement. In some cases, the type of the measurement may be a signal received power-type CLI measurement. For example, the CLI measurement may be an RSRP measurement. In some other examples, the type of the measurement may be a total received power-type CLI measurement. For example, the CLI measurement may be an RSSI measurement.

At 520, base station 105-*c* may transmit a configuration to UE 115-*c* including parameters for transmission of a signal to UE 115-*d* for the CLI measurement. Base station 105-*d* may transmit a parameter to UE 115-*d* for reception of a signal transmitted from UE 115-*c* for the CLI measurement. In cases where the type of the CLI measurement is a signal received power-type CLI measurement the parameter may include a ratio of the second subcarrier spacing to the first subcarrier spacing. UE 115-*c* may identify the parameter for transmission of the signal to UE 115-*d*. UE 115-*d* may identify the parameter for reception of the signal from UE 115-*c*. At 525, UE 115-*d* may determine a type of CLI measurement to perform.

UE 115-*c* may generate the signal based on the configuration and transmit the signal to UE 115-*d* at 530. In some cases, the parameter may indicate that the SCS of UE 115-*c* is smaller than the SCS of UE 115-*d*, where generating the signal includes adjusting a frequency domain comb factor for generating the signal based on the parameter. In some cases, the parameter may indicate that the SCS of UE 115-*c* is smaller than the SCS of UE 115-*d*, where generating the signal may include adjusting a frequency domain comb offset for generating the signal based on the parameter.

In some examples, the parameter may indicate that the SCS of UE 115-*d* is greater than the SCS of UE 115-*c*, where generating the signal includes adjusting a number of symbols for the signal based on the parameter. In some cases, generating the signal may include applying a rotation to at least one symbol of the transmitted symbols to maintain a phase continuity for the transmitted symbols. In some cases, applying the rotation may include time domain rotation of the at least one symbol or frequency domain phase ramping for the at least one symbol.

At 535, UE 115-*d* may measure a signal characteristic of the signal from UE 115-*c* based on the parameter and the type of the CLI measurement. In some cases, the parameter may indicate that the SCS of UE 115-*d* is smaller than the SCS of UE 115-*c*. In this example, UE 115-*d* may adjust a frequency domain comb of a receiver based on the parameter. In some cases, UE 115-*d* may also adjust a frequency domain comb offset of the receiver based on the parameter.

In some cases, the parameter may indicate that the SCS of UE 115-*d* is greater than the SCS of UE 115-*c*, and measuring the signal characteristic may include adjusting a number of measurement symbols for measuring the signal characteristic based on the parameter. In some cases, UE 115-*d* may apply a rotation to at least one symbol of the measurement symbols for demodulation of the signal. In some cases, applying the rotation includes time domain rotation for the at least one symbol or frequency domain phase ramping for the at least one symbol. In some cases, the signal characteristic may be based on a phase continuity between the measurement symbols of the signal. At 540, UE 115-*d* may report the signal characteristic to base station 105-*d*.

Figure 6:
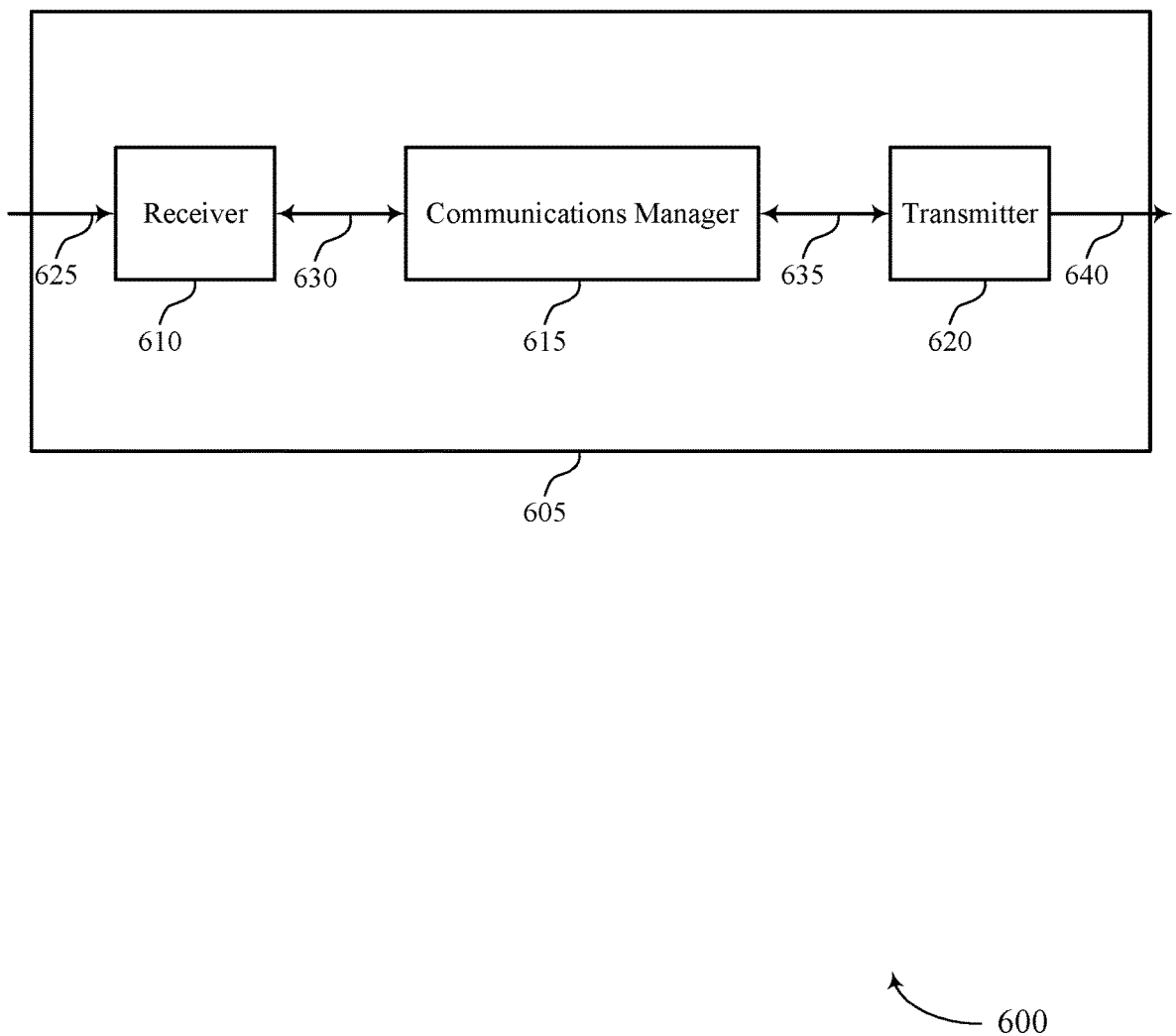
FIGS. 6 and 7 show block diagrams of devices that support subcarrier spacing for UE-to-UE cross link interference measurement in accordance with aspects of the present disclosure.

FIG. 6 shows a block diagram 600 of a device 605 that supports subcarrier spacing for UE-to-UE cross link interference measurement in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information 625 such as packets, user data, or control information associated with various information channels (e.g., control channels, data channels, and information related to subcarrier spacing for UE-to-UE cross link interference measurement, etc.). Information 630 may be passed on to other components of the device 605. The receiver 610 may be an example of aspects of the transceiver 920 described with reference to FIG. 9. The receiver 610 may utilize a single antenna or a set of antennas. In some cases, some operations of the communications manager 615 may be based on information 630 received from the receiver 610. For example, the information 630 may include configurations for transmitting a CLI SRS or a configuration for determining whether to measure a CSLI SRS transmitted by another UE 115.

The communications manager 615 may identify, at a first UE associated with a first subcarrier spacing, a parameter for reception of a signal from a second UE at a second subcarrier spacing, determine a type of a CLI measurement procedure to perform, measure a signal characteristic of the signal from the second UE based on the parameter and the type of the CLI measurement procedure, and report the signal characteristic to a serving base station.

In some cases, the communications manager 615 may identify, at a first UE, a parameter for transmission of a signal to a second UE, where the first UE is configured for communication using a first subcarrier spacing and the second UE is configured for communication using a second subcarrier spacing, generate the signal based on the parameter, and transmit the signal to the second UE.

In some cases, the communications manager 615 may receive, at a first UE configured for communication using a first subcarrier spacing, a configuration for performing a CLI measurement of a signal transmitted from a second UE at a second subcarrier spacing, determine whether the second subcarrier spacing is different from the first subcarrier spacing, and refrain from performing the CLI measurement if the second subcarrier spacing is different from the first subcarrier spacing. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals 640 generated by other components of the device 605. The transmitter 620 may transmit the signals 640 based on information 635 received from the communications manager 615. For example, the transmitter signals 640 may include a CLI SRS, which may be prepared for transmission based on the information 635, or a measurement report based on measuring a CLI SRS. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
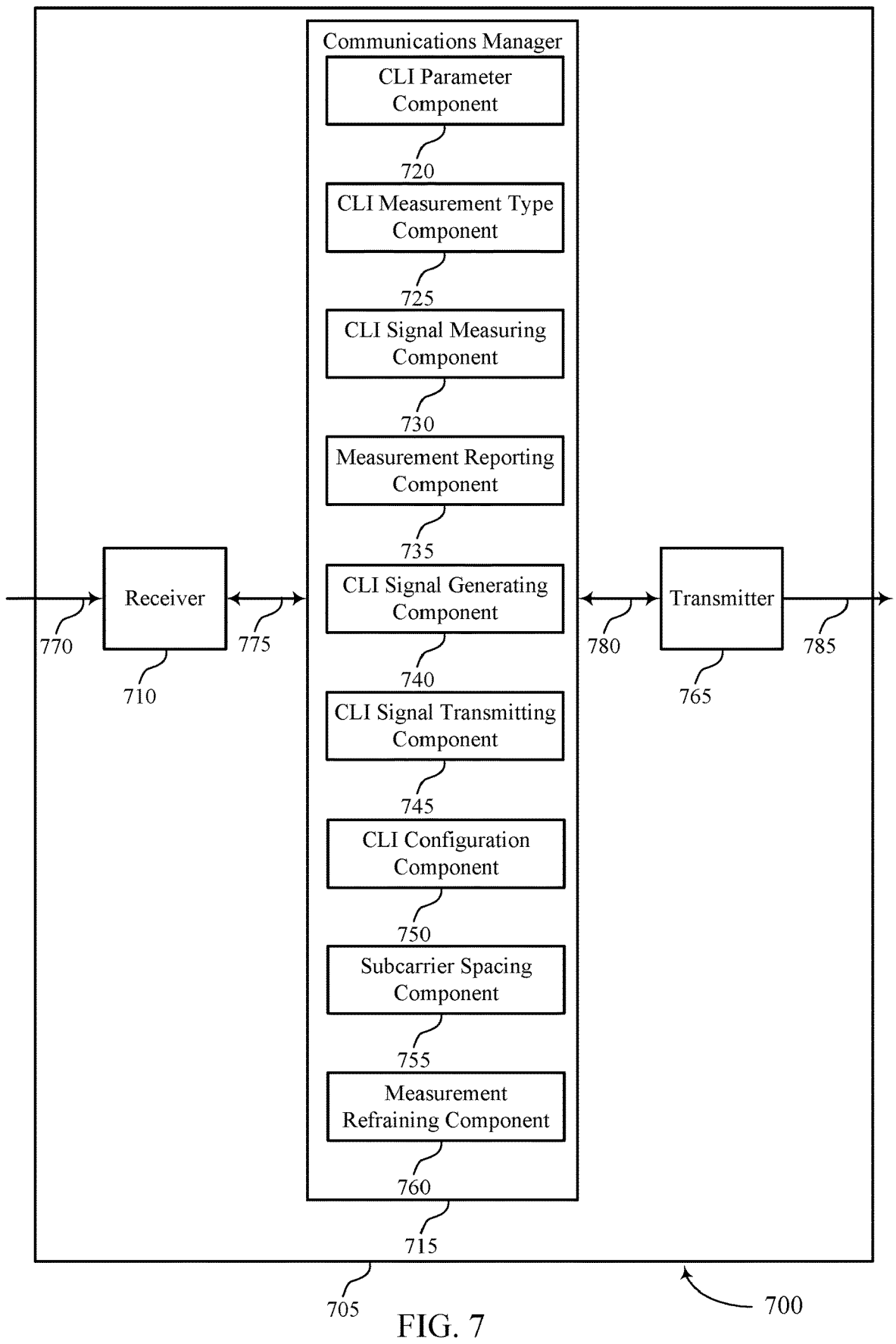

FIG. 7 shows a block diagram 700 of a device 705 that supports subcarrier spacing for UE-to-UE cross link interference measurement in accordance with aspects of the present disclosure. The device 705 may be an example of aspects of a device 605, or a UE 115 as described herein. The device 705 may include a receiver 710, a communications manager 715, and a transmitter 765. The device 705 may also include a processor. Each of these components may be in communication with one another (e.g., via one or more buses).

The receiver 710 may receive information 770 such as packets, user data, or control information associated with various information channels (e.g., control channels, data channels, and information related to subcarrier spacing for UE-to-UE cross link interference measurement, etc.). Information 775 may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CLI parameter component 720, a CLI measurement type component 725, a CLI signal measuring component 730, a measurement reporting component 735, a CLI signal generating component 740, and a CLI signal transmitting component 745. The communications manager 715 may be an example of aspects of the communications manager 910 described herein.

In some cases, some operations of the communications manager 715 may be based on information 775 received from the receiver 710. For example, the information 775 may include a configuration for transmitting a CLI SRS or a configuration for determining whether to monitor for a CLI SRS.

The CLI parameter component 720 may identify, at a first UE associated with a first subcarrier spacing, a parameter for reception of a signal from a second UE at a second subcarrier spacing. The CLI measurement type component 725 may determine a type of a CLI measurement to perform. The CLI signal measuring component 730 may measure a signal characteristic of the signal from the second UE based on the parameter and the type of the CLI measurement. The measurement reporting component 735 may report the signal characteristic to a serving base station.

The CLI parameter component 720 may identify, at a first UE, a parameter for transmission of a signal to a second UE, where the first UE is configured for communication using a first subcarrier spacing and the second UE is configured for communication using a second subcarrier spacing. The CLI signal generating component 740 may generate the signal based on the parameter. The CLI signal transmitting component 745 may transmit the signal to the second UE.

The CLI configuration component 750 may receive, at a first UE configured for communication using a first subcarrier spacing, a configuration for performing a CLI measurement of a signal transmitted from a second UE at a second subcarrier spacing. The subcarrier spacing component 755 may determine whether the second subcarrier spacing is different from the first subcarrier spacing. The measurement refraining component 760 may refrain from performing the CLI measurement if the second subcarrier spacing is different from the first subcarrier spacing.

The transmitter 765 may transmit signals 785 generated by other components of the device 705. In some examples, the transmitter 765 may be collocated with a receiver 710 in a transceiver module. For example, the transmitter 765 may be an example of aspects of the transceiver 920 described with reference to FIG. 9. The transmitter 765 may utilize a single antenna or a set of antennas. The transmitter 765 may transmit signals 785 based on information 780 received from the communications manager 715. For example, the transmitted signals 785 may include a CLI SRS or a measurement report for the CLI SRS, which may be prepared for transmission based on the information 780.

Figure 8:
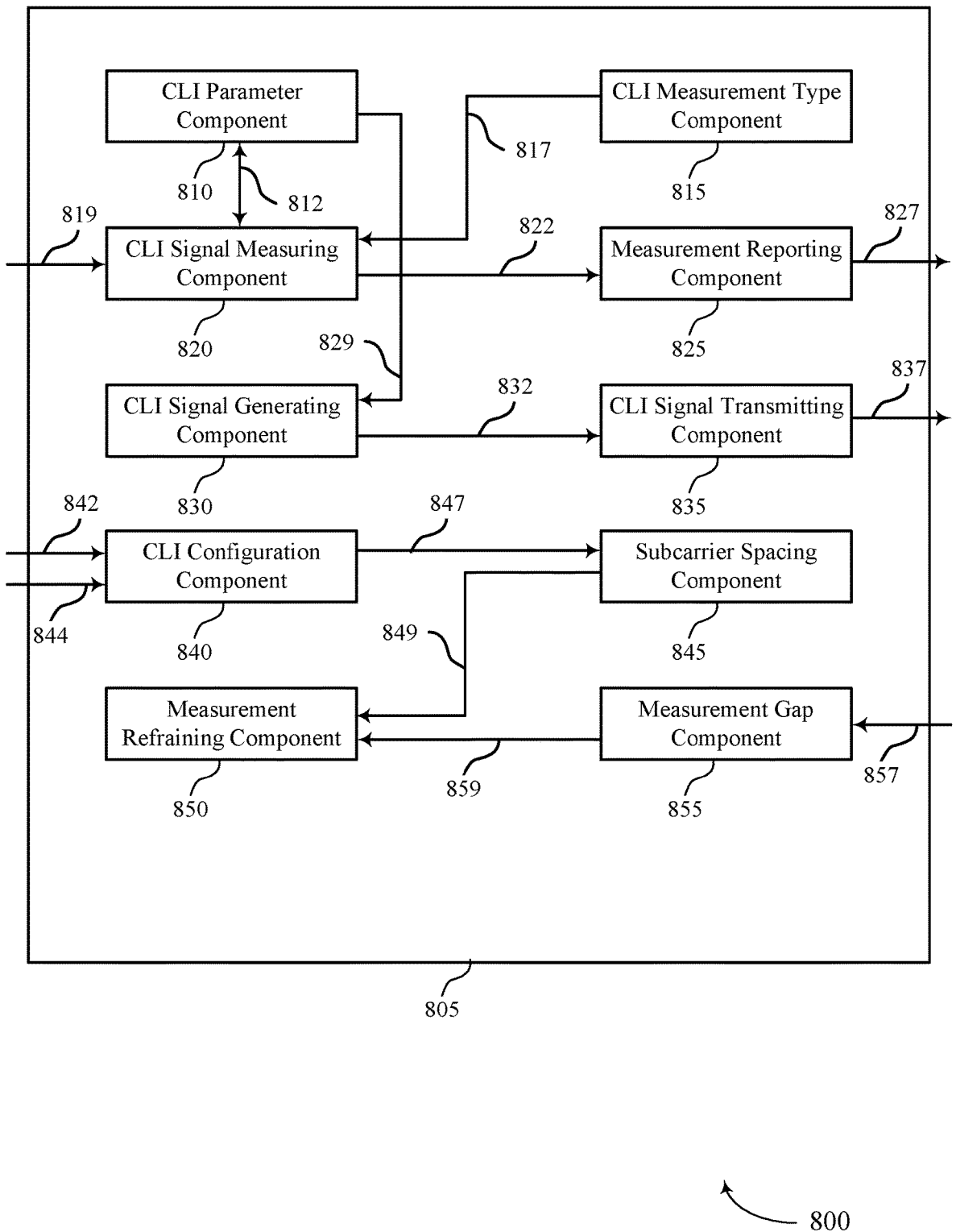
FIG. 8 shows a block diagram of a communications manager that supports subcarrier spacing for UE-to-UE cross link interference measurement in accordance with aspects of the present disclosure.

FIG. 8 shows a block diagram 800 of a communications manager 805 that supports subcarrier spacing for UE-to-UE cross link interference measurement in accordance with aspects of the present disclosure. The communications manager 805 may be an example of aspects of a communications manager 615, a communications manager 715, or a communications manager 910 described herein. The communications manager 805 may include a CLI parameter component 810, a CLI measurement type component 815, a CLI signal measuring component 820, a measurement reporting component 825, a CLI signal generating component 830, and a CLI signal transmitting component 835. Each of these modules may communicate, directly or indirectly, with one another (e.g., via one or more buses).

The CLI parameter component 810 may identify, at a first UE associated with a first subcarrier spacing, a parameter 812 for reception of a signal from a second UE at a second subcarrier spacing. In some cases, the first UE is served by a first cell of a first base station and the second UE is served by a second cell of a second, different base station. In some cases, the first UE and second UEs are served by a same cell. In some cases, the first UE is served by a first cell of a first base station and the second UE is served by a second cell of a second, different base station. The first UE 115 may send the parameter 812 for reception to a CLI signal measuring component 820.

The CLI measurement type component 815 may determine a type of a CLI measurement procedure to perform. In some cases, the type of CLI measurement procedure includes a signal received power-type CLI measurement procedure. In some cases, the type of CLI measurement procedure is based on the first subcarrier spacing being equivalent to the second subcarrier spacing. In some cases, the type of CLI measurement procedure is a total received power-type CLI measurement procedure. In some cases, the type of CLI measurement procedure is based at least in part the first subcarrier spacing being different from the second subcarrier spacing. In some cases the CLI measurement type component 815 may send an indication 817 of the type of CLI measurement to the CLI signal measuring component 820.

The CLI signal measuring component 820 may measure a signal characteristic of the signal 819 from the second UE based on the parameter 812 and the type of the CLI measurement procedure (e.g., sent in the indication 817). In some examples, the CLI signal measuring component 820 may adjust a frequency domain comb factor of a receiver based on the parameter. In some examples, the CLI signal measuring component 820 may adjust a frequency domain comb offset of a receiver based on the parameter.

In some examples, the CLI signal measuring component 820 may adjust a number of measurement symbols for measuring the signal characteristic based on the parameter. In some examples, measuring the signal characteristic includes applying a rotation to at least one symbol of the measurement symbols for demodulation of the signal. In some examples, apply the rotation includes time domain rotation of the at least one symbol or frequency domain phase ramping for the at least one symbol. In some examples, the CLI signal measuring component 820 may measure the signal characteristic is based on a phase continuity between the measurement symbols of the signal. In some examples, the CLI signal measuring component 820 may receive a configuration for a dedicated measurement gap for the CLI measurement procedure, where the measurement gap is configured based part on the type of the CLI measurement procedure, the first subcarrier spacing, and the second subcarrier spacing. In some cases, the CLI signal measuring component 820 may switch to the second subcarrier spacing for the measurement gap. The measurement reporting component 825 may report the signal characteristic 827 to a serving base station. In some cases, the measurement reporting component 825 may receive the signal characteristic in an indication 822 from the CLI signal measuring component 820.

In some examples, the CLI parameter component 810 may identify, at a first UE, a parameter 829 for transmission of a signal to a second UE, where the first UE is configured for communication using a first subcarrier spacing and the second UE is configured for communication using a second subcarrier spacing. The CLI signal generating component 830 may generate the signal 832 based on the parameter 829. In some examples, the CLI signal generating component 830 may adjust a frequency domain comb factor for generating the signal based on the parameter. In some examples, the CLI signal generating component 830 may adjust a frequency domain comb offset for generating the signal based on the parameter.

In some examples, the CLI signal generating component 830 may adjust a number of transmitted symbols for the signal based on the parameter. In some examples, generating the signal includes applying a rotation to at least one symbol of the transmitted symbols to maintain a phase continuity for the transmitted symbols. In some examples, apply the rotation includes time domain rotation of the at least one symbol or frequency domain phase ramping for the at least one symbol. The CLI signal transmitting component 835 may transmit the signal 837 to the second UE.

The CLI configuration component 840 may receive, at a first UE configured for communication using a first subcarrier spacing, a configuration 842 for performing a CLI measurement of a signal 844 transmitted from a second UE at a second subcarrier spacing. In some examples, the CLI configuration component 840 may perform the CLI measurement on the signal to obtain a signal characteristic associated with the signal if the second subcarrier spacing is the same as the first subcarrier spacing.

In some examples, the CLI configuration component 840 may report the signal characteristic to a serving base station. In some examples, the CLI configuration component 840 may receive a second configuration for performing a received power-type CLI measurement at the second subcarrier spacing. In some examples, the CLI configuration component 840 may perform the received power-type CLI measurement at the second subcarrier spacing.

In some examples, the CLI configuration component 840 may report a characteristic measured from the received power-type CLI measurement to a serving base station. In some cases, the configuration includes a first configuration associated with a signal received power-type CLI measurement, and the refraining from performing the CLI measurement is based on the signal received power-type CLI measurement. In some cases, the first UE is served by a first cell of a first base station and the second UE is served by a second cell of a second, different base station. In some cases, the first UE and second UEs are served by a same cell. The subcarrier spacing component 845 may determine whether the second subcarrier spacing is different from the first subcarrier spacing. In some cases, the subcarrier spacing component 845 may determine that the subcarrier spacings are different based on an indication 847 received from the CLI configuration component. The subcarrier spacing component 845 may send an indication 849 that the subcarrier spacings are different to the measurement refraining component 850.

The measurement refraining component 850 may refrain from performing (e.g., suppress performing) the CLI measurement if the second subcarrier spacing is different from the first subcarrier spacing. The measurement gap component 855 may receive a measurement gap for performing the CLI measurement, where the measurement gap is configured based on a type of the CLI measurement, the first subcarrier spacing, and the second subcarrier spacing. In some cases, the measurement gap component 855 may receive an indication 857 of the measurement gap (e.g., from a base station 105). The measurement gap component 855 may send an indication 859 of the measurement gap to the measurement refraining component 850, or the CLI configuration component 840, or both. In some examples, the measurement gap component 855 may switch to the second subcarrier spacing for the measurement gap. In some examples, the measurement gap component 855 may perform the CLI measurement of the signal from the second UE based on the type of the CLI measurement to obtain a signal characteristic of the signal. In some examples, the measurement gap component 855 may report the signal characteristic to a serving base station.

Figure 9:
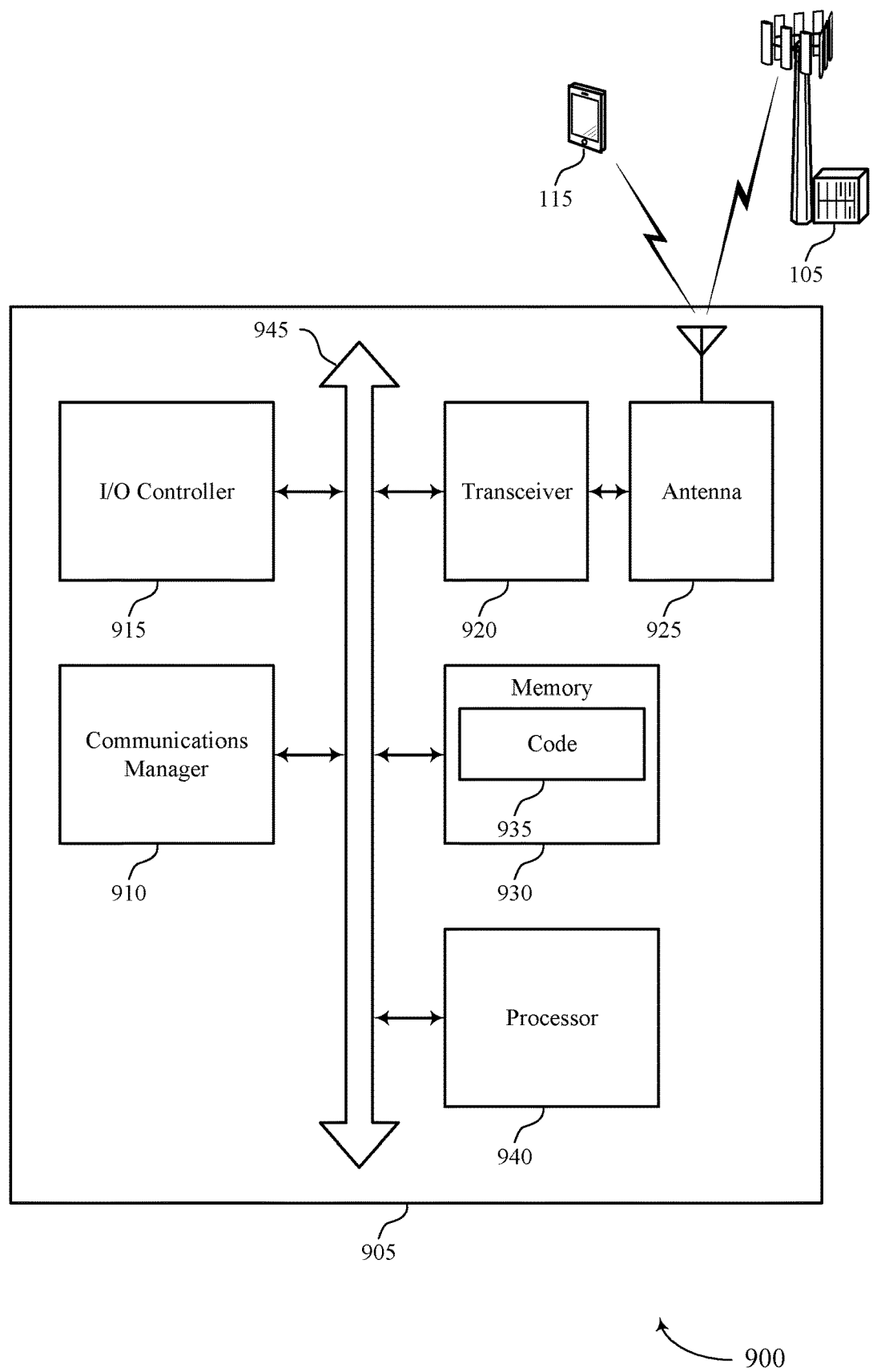
FIG. 9 shows a diagram of a system including a device that supports subcarrier spacing for UE-to-UE cross link interference measurement in accordance with aspects of the present disclosure.

FIG. 9 shows a diagram of a system 900 including a device 905 that supports subcarrier spacing for UE-to-UE cross link interference measurement in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify, at a first UE associated with a first subcarrier spacing, a parameter for reception of a signal from a second UE at a second subcarrier spacing, determine a type of a CLI measurement procedure to perform, measure a signal characteristic of the signal from the second UE based on the parameter and the type of the CLI measurement procedure, and report the signal characteristic to a serving base station. The communications manager 910 may also identify, at a first UE, a parameter for transmission of a signal to a second UE, where the first UE is configured for communication using a first subcarrier spacing and the second UE is configured for communication using a second subcarrier spacing, generate the signal based on the parameter, and transmit the signal to the second UE.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting subcarrier spacing for UE-to-UE cross link interference measurement).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
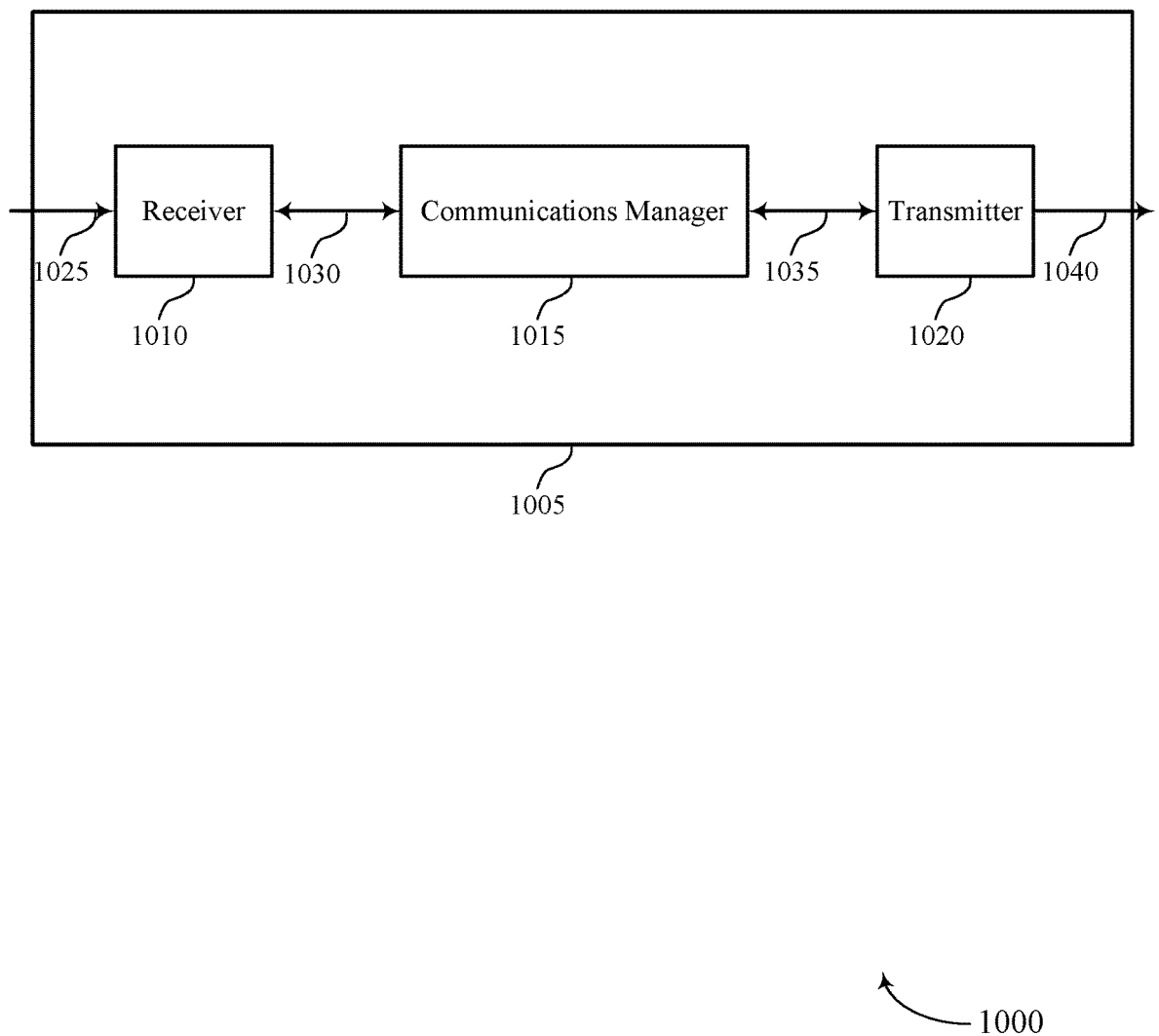
FIGS. 10 and 11 show block diagrams of devices that support subcarrier spacing for UE-to-UE cross link interference measurement in accordance with aspects of the present disclosure.

FIG. 10 shows a block diagram 1000 of a device 1005 that supports subcarrier spacing for UE-to-UE cross link interference measurement in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information 1025 such as packets, user data, or control information associated with various information channels (e.g., control channels, data channels, and information related to subcarrier spacing for UE-to-UE cross link interference measurement, etc.). Information 1030 may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify, at a base station serving a first UE, an overlap between a downlink symbol or a flexible symbol for the first UE and an uplink symbol for a second UE, where the first UE is configured for communication using a first subcarrier spacing and the second UE is configured for communication using a second subcarrier spacing, determine a type of a CLI measurement to be performed by the first UE, transmit a configuration to the first UE for reception of a signal transmitted at the second subcarrier spacing from the second UE for the CLI measurement, and receive a signal characteristic measured by the first UE for the CLI measurement.

The communications manager 1015 may also identify, at a base station serving a first UE, an overlap between an uplink symbol for the first UE and a downlink or flexible symbol for a second UE, where the first UE is configured for communication using a first subcarrier spacing and the second UE is configured for communication using a second subcarrier spacing, determine a type of a CLI measurement to be performed by the second UE, and transmit a configuration to the first UE for transmission of a signal at the first subcarrier spacing to the second UE for the CLI measurement. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals 1040 generated by other components of the device 1005. In some cases, the transmitter 1020 may generate the signals 1040 based on the operations of the communications manager 1015. For example, the communications manager 1015 may send information 1035 to configure a UE 115 to transmit or monitor for a CLI SRS. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
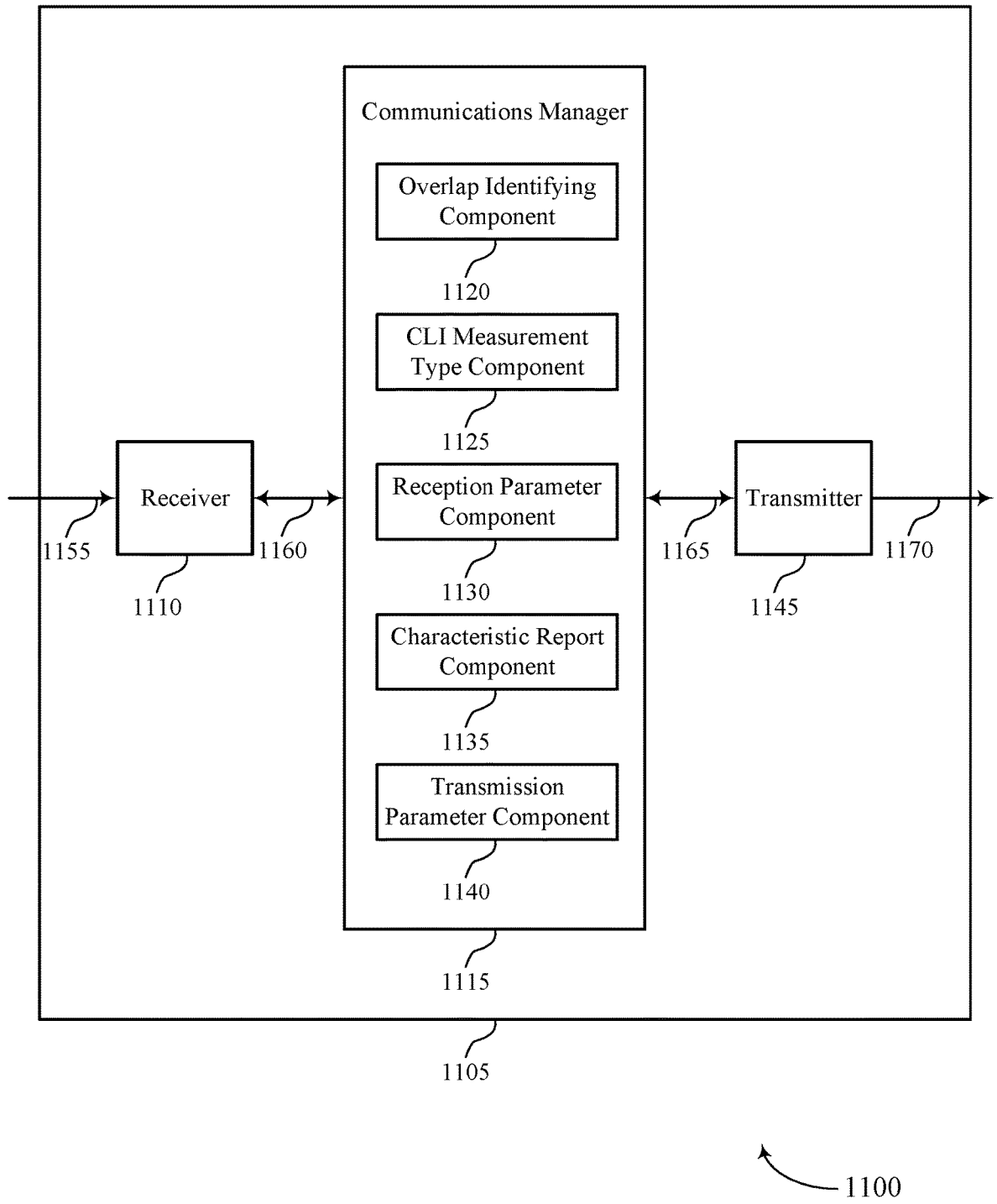

FIG. 11 shows a block diagram 1100 of a device 1105 that supports subcarrier spacing for UE-to-UE cross link interference measurement in accordance with aspects of the present disclosure. The device 1105 may be an example of aspects of a device 1005, or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information 1155 such as packets, user data, or control information associated with various information channels (e.g., control channels, data channels, and information related to subcarrier spacing for UE-to-UE cross link interference measurement, etc.). Information 1160 may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an overlap identifying component 1120, a CLI measurement type component 1125, a reception parameter component 1130, a characteristic report component 1135, and a transmission parameter component 1140. The communications manager 1115 may be an example of aspects of the communications manager 1310 described herein.

The overlap identifying component 1120 may identify, at a base station serving a first UE, an overlap between a downlink symbol or a flexible symbol for the first UE and an uplink symbol for a second UE, where the first UE is configured for communication using a first subcarrier spacing and the second UE is configured for communication using a second subcarrier spacing. The CLI measurement type component 1125 may determine a type of a CLI measurement to be performed by the first UE. The reception parameter component 1130 may transmit a configuration to the first UE for reception of a signal transmitted at the second subcarrier spacing from the second UE for the CLI measurement. The characteristic report component 1135 may receive a signal characteristic measured by the first UE for the CLI measurement.

The overlap identifying component 1120 may identify, at a base station serving a first UE, an overlap between an uplink symbol for the first UE and a downlink or flexible symbol for a second UE, where the first UE is configured for communication using a first subcarrier spacing and the second UE is configured for communication using a second subcarrier spacing. The CLI measurement type component 1125 may determine a type of a CLI measurement to be performed by the second UE. The transmission parameter component 1140 may transmit a configuration to the first UE for transmission of a signal at the first subcarrier spacing to the second UE for the CLI measurement.

The transmitter 1145 may transmit signals 1170 generated by other components of the device 1105. For example, the transmitter 1145 may receive information 1165 from the communications manager 1115, and the signals 1170 may be based on the information 1165. For example, the information 1165 may include configurations for a UE 115 to transmit, receive, or measure a CLI SRS, or for a UE 115 to transmit a measurement report for a CLI SRS. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
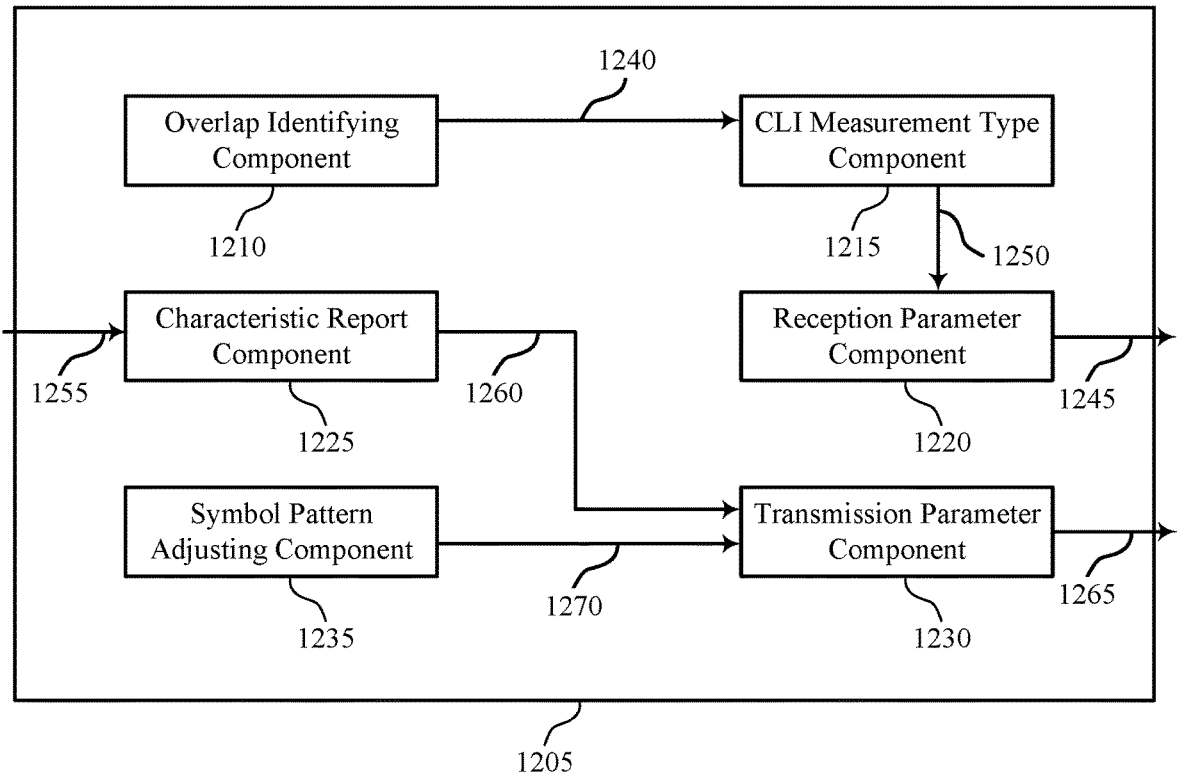
FIG. 12 shows a block diagram of a communications manager that supports subcarrier spacing for UE-to-UE cross link interference measurement in accordance with aspects of the present disclosure.

FIG. 12 shows a block diagram 1200 of a communications manager 1205 that supports subcarrier spacing for UE-to-UE cross link interference measurement in accordance with aspects of the present disclosure. The communications manager 1205 may be an example of aspects of a communications manager 1015, a communications manager 1115, or a communications manager 1310 described herein. The communications manager 1205 may include an overlap identifying component 1210, a CLI measurement type component 1215, a reception parameter component 1220, a characteristic report component 1225, a transmission parameter component 1230, and a symbol pattern adjusting component 1235. Each of these modules may communicate, directly or indirectly, with one another (e.g., via one or more buses).

The overlap identifying component 1210 may identify, at a base station serving a first UE, an overlap between a downlink symbol or a flexible symbol for the first UE and an uplink symbol for a second UE, where the first UE is configured for communication using a first subcarrier spacing and the second UE is configured for communication using a second subcarrier spacing.

In some examples, the overlap identifying component 1210 may identify, at a base station serving a first UE, an overlap between an uplink symbol for the first UE and a downlink or flexible symbol for a second UE, where the first UE is configured for communication using a first subcarrier spacing and the second UE is configured for communication using a second subcarrier spacing. In some cases, the base station serves the first UE via a first cell and the second UE is served by a second cell of a second, different base station. In some cases, the base station serves the first UE and the second UE via a same cell.

The CLI measurement type component 1215 may determine a type of a CLI measurement to be performed by the first UE. In some examples, the overlap identifying component 1210 may send an overlap indication 1240 of the identified symbol overlap, and the type of CLI measurement may be based on the identified symbol overlap. In some examples, the CLI measurement type component 1215 may determine a type of a CLI measurement to be performed by the second UE. In some examples, the CLI measurement type component 1215 may determine the type of the CLI measurement to be a signal received power-type CLI measurement based on the first subcarrier spacing being equivalent to the second subcarrier spacing.

In some examples, the CLI measurement type component 1215 may configure a dedicated measurement gap for the CLI measurement based on the type of the CLI measurement, the first subcarrier spacing, and the second subcarrier spacing. In some examples, the CLI measurement type component 1215 may transmit an indicator of the dedicated measurement gap to the first UE.

In some examples, the CLI measurement type component 1215 may determine the type of the CLI measurement to be a total received power-type CLI measurement based on the first subcarrier spacing being different from the second subcarrier spacing. In some examples, the CLI measurement type component 1215 may determine the type of the CLI measurement to be a signal received power-type CLI measurement based on the first subcarrier spacing being equivalent to the second subcarrier spacing. In some examples, the CLI measurement type component 1215 may determine the type of the CLI measurement to be a total received power-type CLI measurement based on the first subcarrier spacing being different from the second subcarrier spacing. In some cases, the type of the CLI measurement is a signal received power-type CLI measurement and the parameter includes a ratio of the second subcarrier spacing to the first subcarrier spacing. In some cases, the type of the CLI measurement is an RSRP-type CLI measurement and the parameter includes a ratio of the second subcarrier spacing to the first subcarrier spacing.

The reception parameter component 1220 may transmit a configuration 1245 to the first UE for reception of a signal transmitted at the second subcarrier spacing from the second UE for the CLI measurement. In some cases, the configuration 1245 may be based on a measurement type to be performed by the first UE, which may be indicated to the reception parameter component 1220 via an indication 1250 from the CLI measurement type component 1215. In some examples, the configuration 1245 may include one or more parameters for reception of the signal.

The characteristic report component 1225 may receive a signal characteristic 1255 measured by the first UE for the CLI measurement. In some cases, the characteristics report component 1225 may send signal characteristic information 1260 to the transmission parameter component 1230. The transmission parameter component 1230 may transmit a configuration 1265 to the first UE for transmission of a signal at the first subcarrier spacing to the second UE for the CLI measurement. In some cases, the configuration 1265 may include one or more parameters for transmission of the signal. The symbol pattern adjusting component 1235 may adjust (e.g., via an adjustment indication 1270) a symbol pattern for the first UE for a slot including transmission of the signal based on the first subcarrier spacing being different from the second subcarrier spacing. In some examples, the symbol pattern adjustment may be made based on the signal characteristic 1255 or the signal characteristic information 1260. In some cases, the adjusting the symbol pattern includes determining each symbol for the first UE overlapping with a receive symbol for the signal for the second UE to be an uplink symbol.

Figure 13:
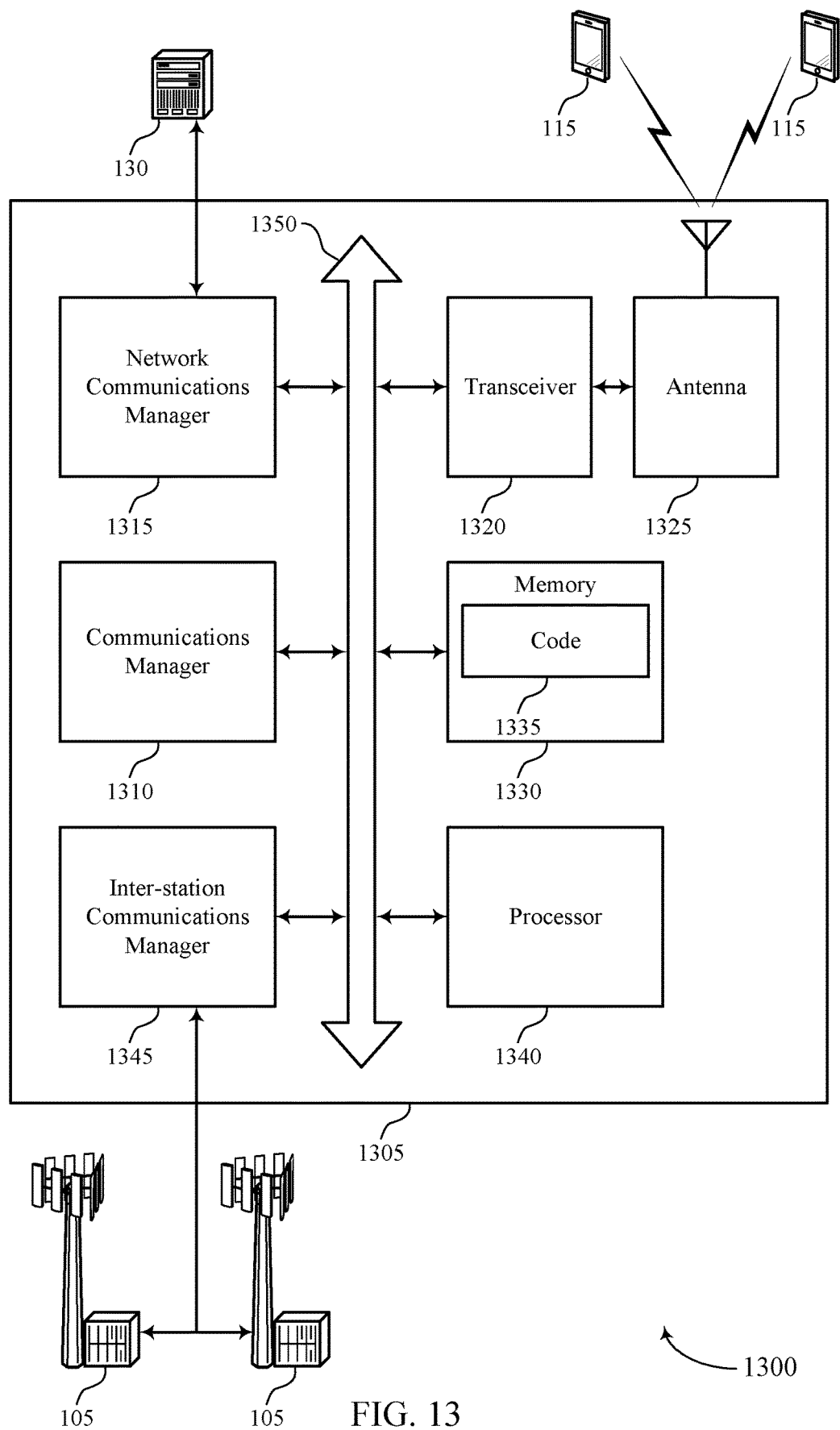
FIG. 13 shows a diagram of a system including a device that supports subcarrier spacing for UE-to-UE cross link interference measurement in accordance with aspects of the present disclosure.

FIG. 13 shows a diagram of a system 1300 including a device 1305 that supports subcarrier spacing for UE-to-UE cross link interference measurement in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify, at a base station serving a first UE, an overlap between a downlink symbol or a flexible symbol for the first UE and an uplink symbol for a second UE, where the first UE is configured for communication using a first subcarrier spacing and the second UE is configured for communication using a second subcarrier spacing, determine a type of a CLI measurement to be performed by the first UE, transmit a configuration to the first UE for reception of a signal transmitted at the second subcarrier spacing from the second UE for the CLI measurement, and receive a signal characteristic measured by the first UE for the CLI measurement.

The communications manager 1310 may also identify, at a base station serving a first UE, an overlap between an uplink symbol for the first UE and a downlink or flexible symbol for a second UE, where the first UE is configured for communication using a first subcarrier spacing and the second UE is configured for communication using a second subcarrier spacing, determine a type of a CLI measurement to be performed by the second UE, and transmit a configuration to the first UE for transmission of a signal at the first subcarrier spacing to the second UE for the CLI measurement.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting subcarrier spacing for UE-to-UE cross link interference measurement).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
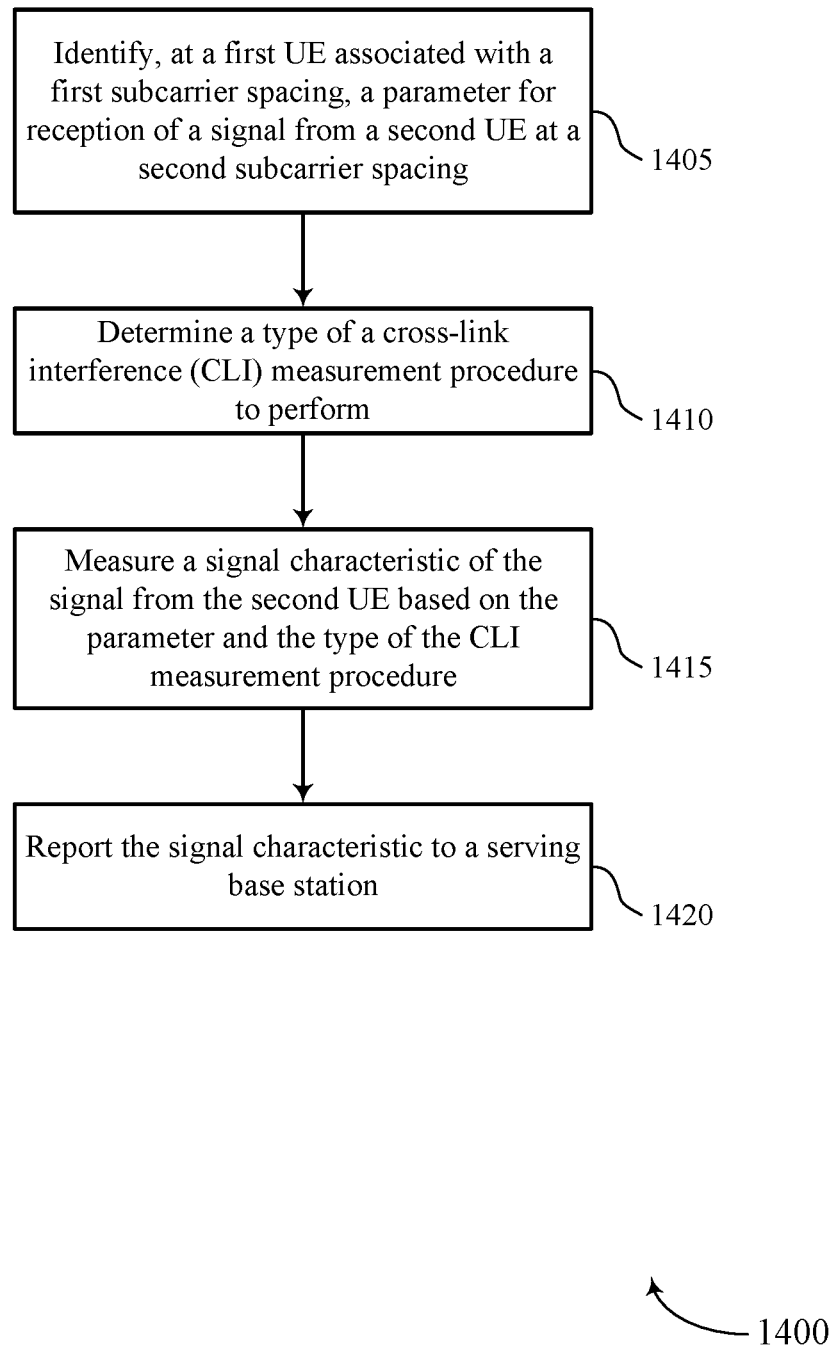
FIGS. 14 through 19 show flowcharts illustrating methods that support subcarrier spacing for UE-to-UE cross link interference measurement in accordance with aspects of the present disclosure.

FIG. 14 shows a flowchart illustrating a method 1400 that supports subcarrier spacing for UE-to-UE cross link interference measurement in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify, at a first UE associated with a first subcarrier spacing, a parameter for reception of a signal from a second UE at a second subcarrier spacing. The operations of 1405 may be performed according to the methods described herein. In some examples, aspects of the operations of 1405 may be performed by a CLI parameter component as described with reference to FIGS. 6 through 9.

At 1410, the UE may determine a type of a CLI measurement procedure, or a type of a CLI measurement, to perform. The operations of 1410 may be performed according to the methods described herein. In some examples, aspects of the operations of 1410 may be performed by a CLI measurement type component as described with reference to FIGS. 6 through 9.

At 1415, the UE may measure a signal characteristic of the signal from the second UE based on the parameter and the type of the CLI measurement. The operations of 1415 may be performed according to the methods described herein. In some examples, aspects of the operations of 1415 may be performed by a CLI signal measuring component as described with reference to FIGS. 6 through 9.

At 1420, the UE may report the signal characteristic to a serving base station. The operations of 1420 may be performed according to the methods described herein. In some examples, aspects of the operations of 1420 may be performed by a measurement reporting component as described with reference to FIGS. 6 through 9.

Figure 15:
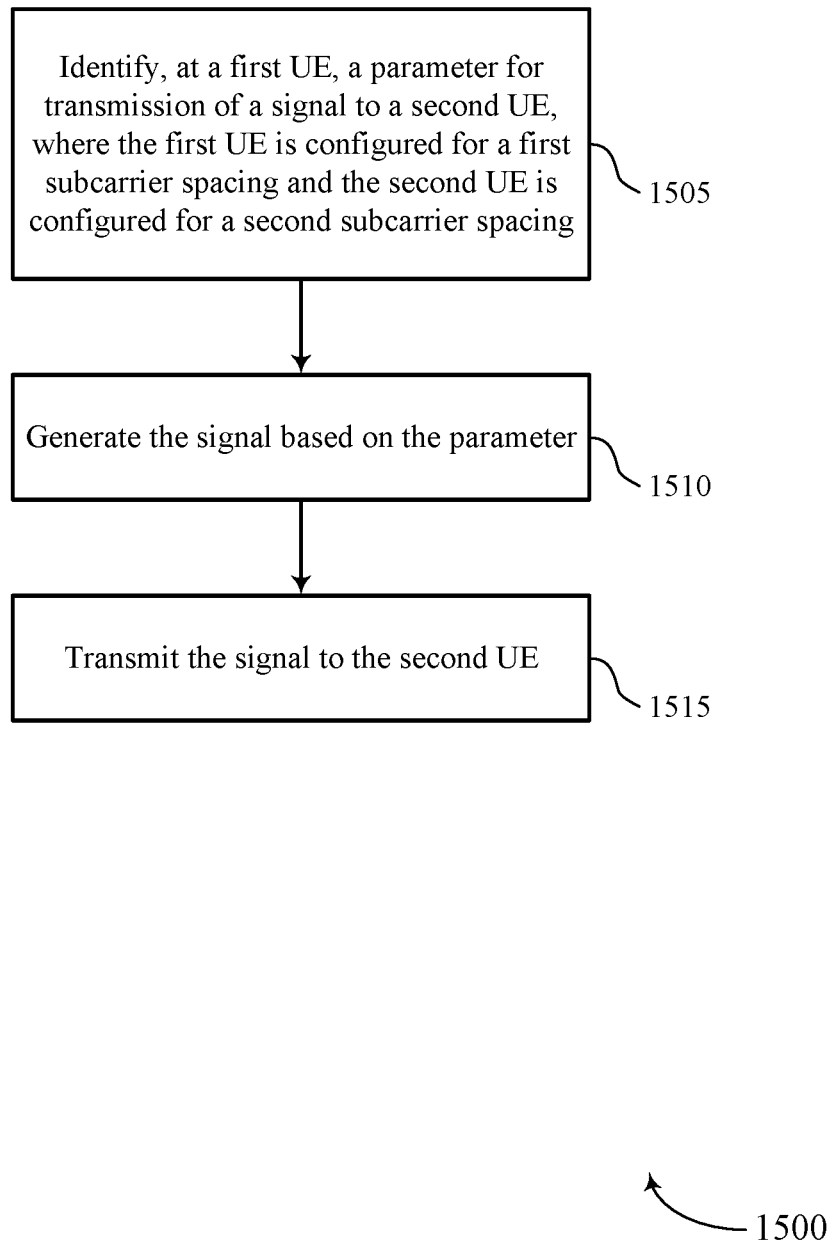

FIG. 15 shows a flowchart illustrating a method 1500 that supports subcarrier spacing for UE-to-UE cross link interference measurement in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify, at a first UE, a parameter for transmission of a signal to a second UE, where the first UE is configured for communication using a first subcarrier spacing and the second UE is configured for communication using a second subcarrier spacing. The operations of 1505 may be performed according to the methods described herein. In some examples, aspects of the operations of 1505 may be performed by a CLI parameter component as described with reference to FIGS. 6 through 9.

At 1510, the UE may generate the signal based on the parameter. The operations of 1510 may be performed according to the methods described herein. In some examples, aspects of the operations of 1510 may be performed by a CLI signal generating component as described with reference to FIGS. 6 through 9.

At 1515, the UE may transmit the signal to the second UE. The operations of 1515 may be performed according to the methods described herein. In some examples, aspects of the operations of 1515 may be performed by a CLI signal transmitting component as described with reference to FIGS. 6 through 9.

Figure 16:
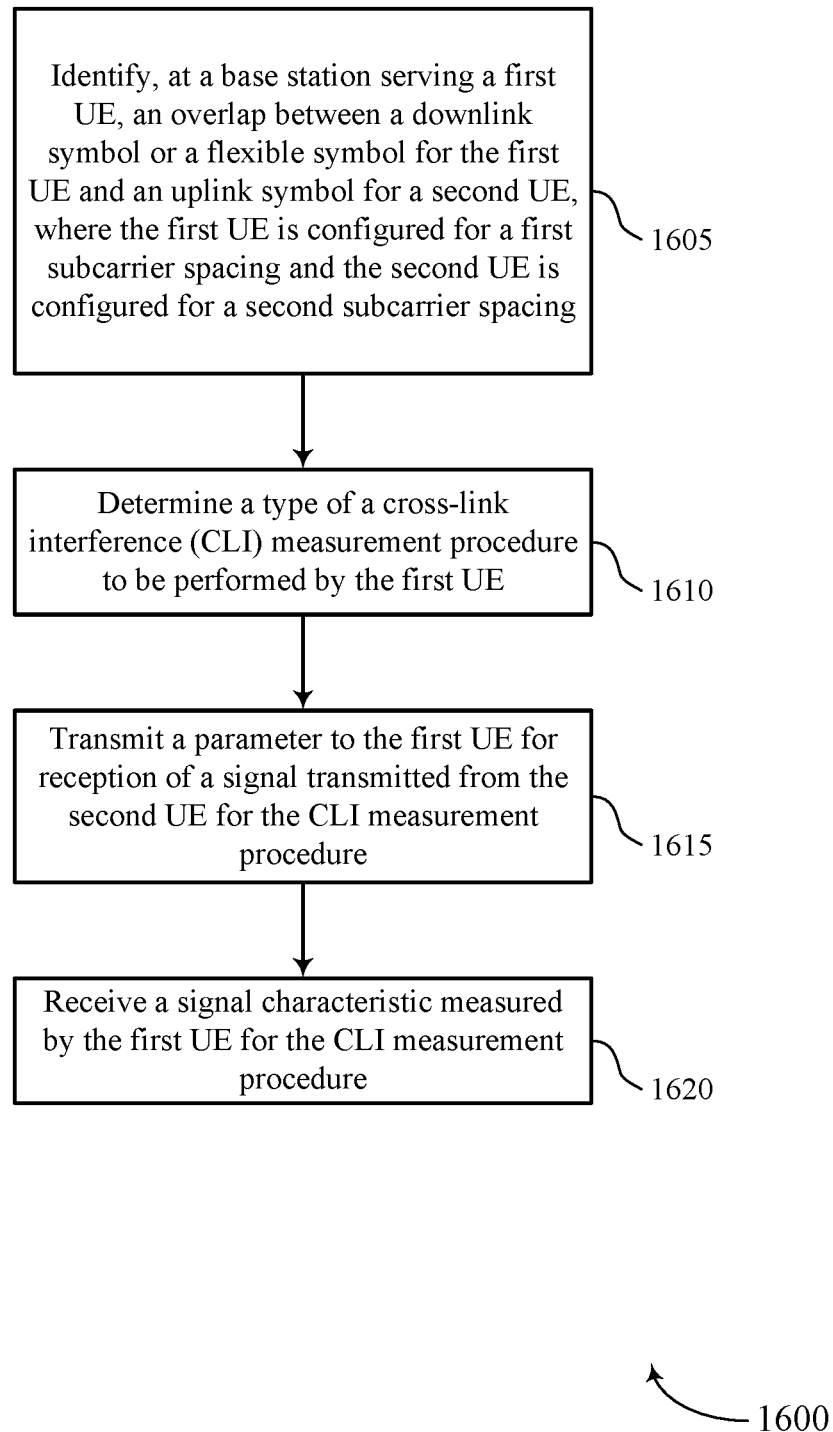

FIG. 16 shows a flowchart illustrating a method 1600 that supports subcarrier spacing for UE-to-UE cross link interference measurement in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may identify, at a base station serving a first UE, an overlap between a downlink symbol or a flexible symbol for the first UE and an uplink symbol for a second UE, where the first UE is configured for communication using a first subcarrier spacing and the second UE is configured for communication using a second subcarrier spacing. The operations of 1605 may be performed according to the methods described herein. In some examples, aspects of the operations of 1605 may be performed by an overlap identifying component as described with reference to FIGS. 10 through 13.

At 1610, the base station may determine a type of a CLI measurement to be performed by the first UE. The operations of 1610 may be performed according to the methods described herein. In some examples, aspects of the operations of 1610 may be performed by a CLI measurement type component as described with reference to FIGS. 10 through 13.

At 1615, the base station may transmit a configuration to the first UE for reception of a signal transmitted at the second subcarrier spacing from the second UE for the CLI measurement. The operations of 1615 may be performed according to the methods described herein. In some examples, aspects of the operations of 1615 may be performed by a reception parameter component as described with reference to FIGS. 10 through 13.

At 1620, the base station may receive a signal characteristic measured by the first UE for the CLI measurement. The operations of 1620 may be performed according to the methods described herein. In some examples, aspects of the operations of 1620 may be performed by a characteristic report component as described with reference to FIGS. 10 through 13.

Figure 17:
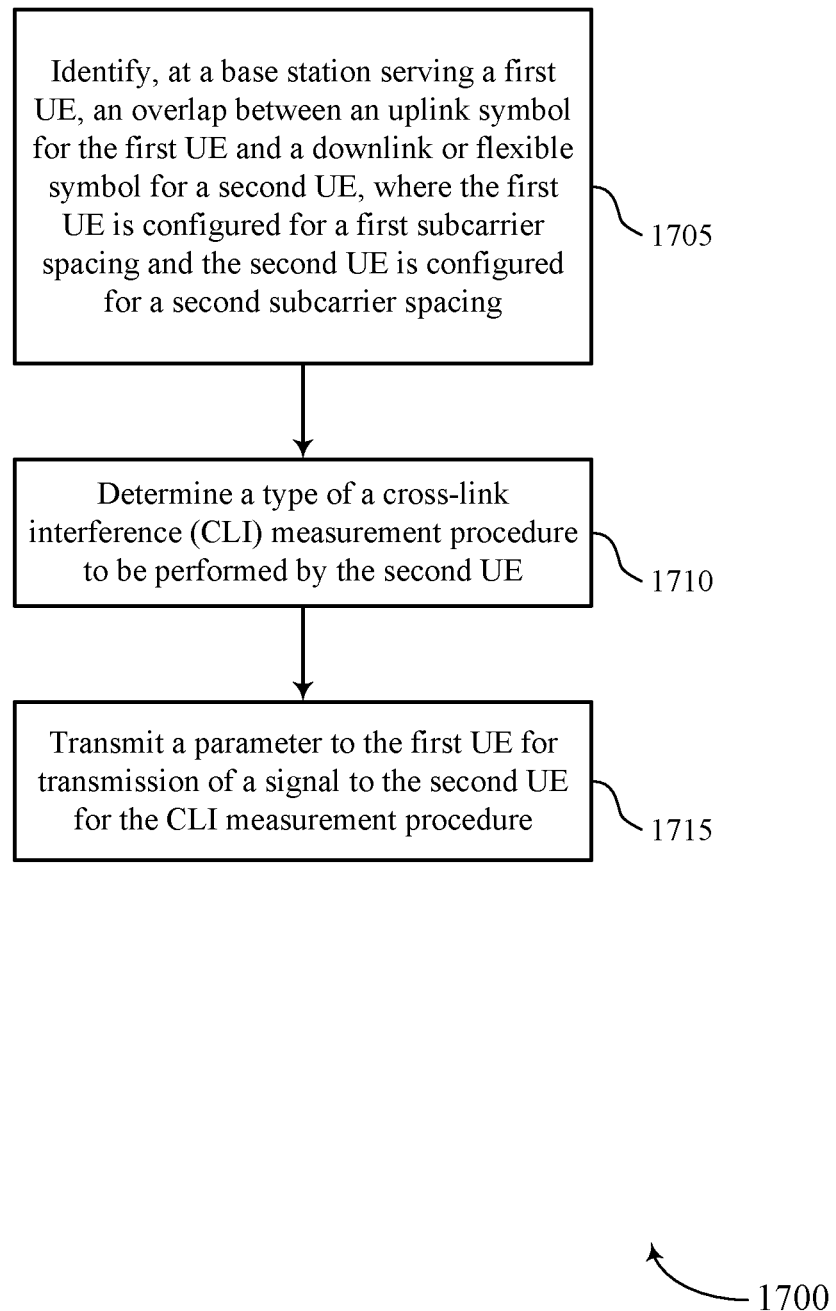

FIG. 17 shows a flowchart illustrating a method 1700 that supports subcarrier spacing for UE-to-UE cross link interference measurement in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify, at a base station serving a first UE, an overlap between an uplink symbol for the first UE and a downlink or flexible symbol for a second UE, where the first UE is configured for communication using a first subcarrier spacing and the second UE is configured for communication using a second subcarrier spacing. The operations of 1705 may be performed according to the methods described herein. In some examples, aspects of the operations of 1705 may be performed by an overlap identifying component as described with reference to FIGS. 10 through 13.

At 1710, the base station may determine a type of a CLI measurement, or a type of CLI measurement procedure, to be performed by the second UE. The operations of 1710 may be performed according to the methods described herein. In some examples, aspects of the operations of 1710 may be performed by a CLI measurement type component as described with reference to FIGS. 10 through 13.

At 1715, the base station may transmit a configuration to the first UE for transmission of a signal at the first subcarrier spacing to the second UE for the CLI measurement procedure. The operations of 1715 may be performed according to the methods described herein. In some examples, aspects of the operations of 1715 may be performed by a transmission parameter component as described with reference to FIGS. 10 through 13.

Figure 18:
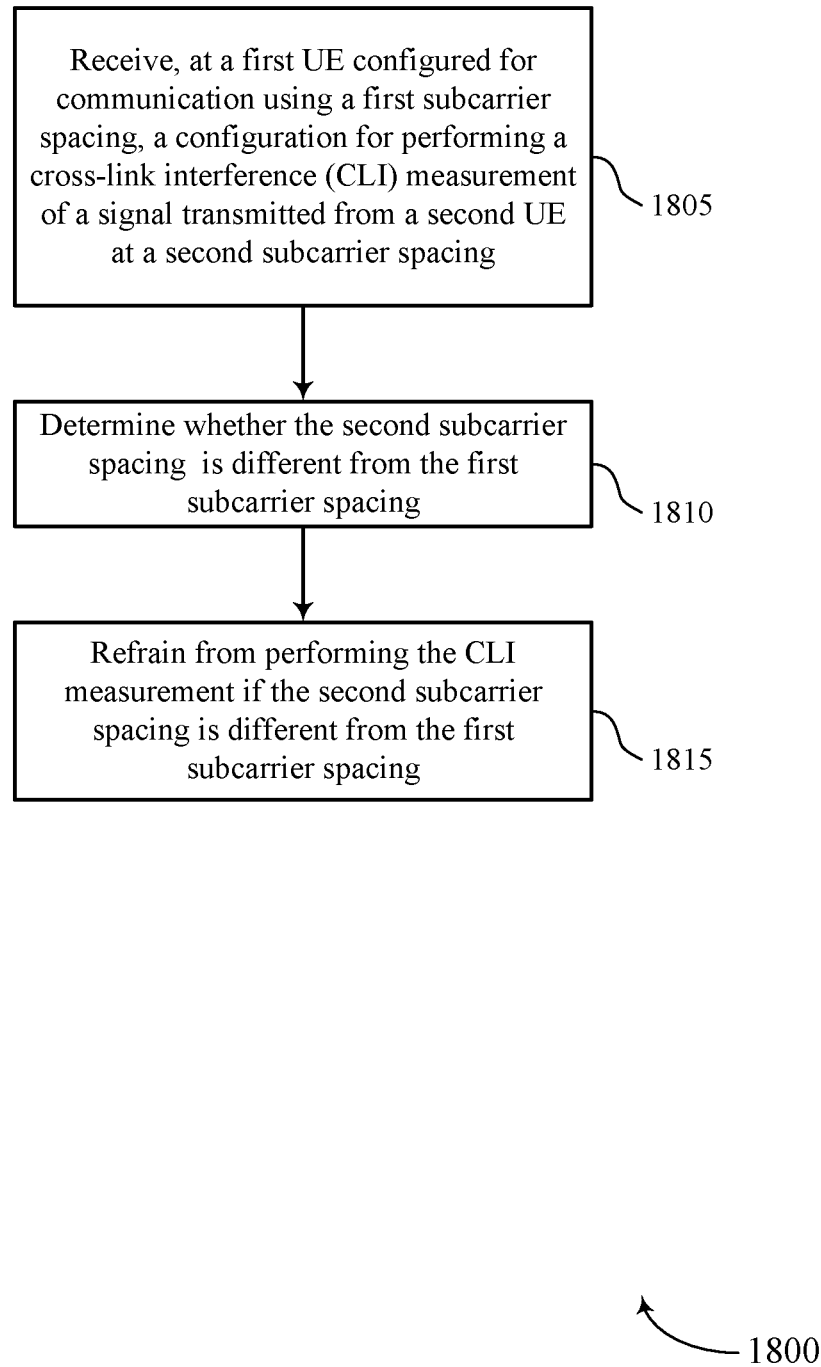

FIG. 18 shows a flowchart illustrating a method 1800 that supports subcarrier spacing for UE-to-UE cross link interference measurement in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive, at a first UE configured for communication using a first subcarrier spacing, a configuration for performing a CLI measurement of a signal transmitted from a second UE at a second subcarrier spacing. The operations of 1805 may be performed according to the methods described herein. In some examples, aspects of the operations of 1805 may be performed by a CLI configuration component as described with reference to FIGS. 6 through 9.

At 1810, the UE may determine whether the second subcarrier spacing is different from the first subcarrier spacing. The operations of 1810 may be performed according to the methods described herein. In some examples, aspects of the operations of 1810 may be performed by a subcarrier spacing component as described with reference to FIGS. 6 through 9.

At 1815, the UE may refrain from performing the CLI measurement if the second subcarrier spacing is different from the first subcarrier spacing. The operations of 1815 may be performed according to the methods described herein. In some examples, aspects of the operations of 1815 may be performed by a measurement refraining component as described with reference to FIGS. 6 through 9.

Figure 19:
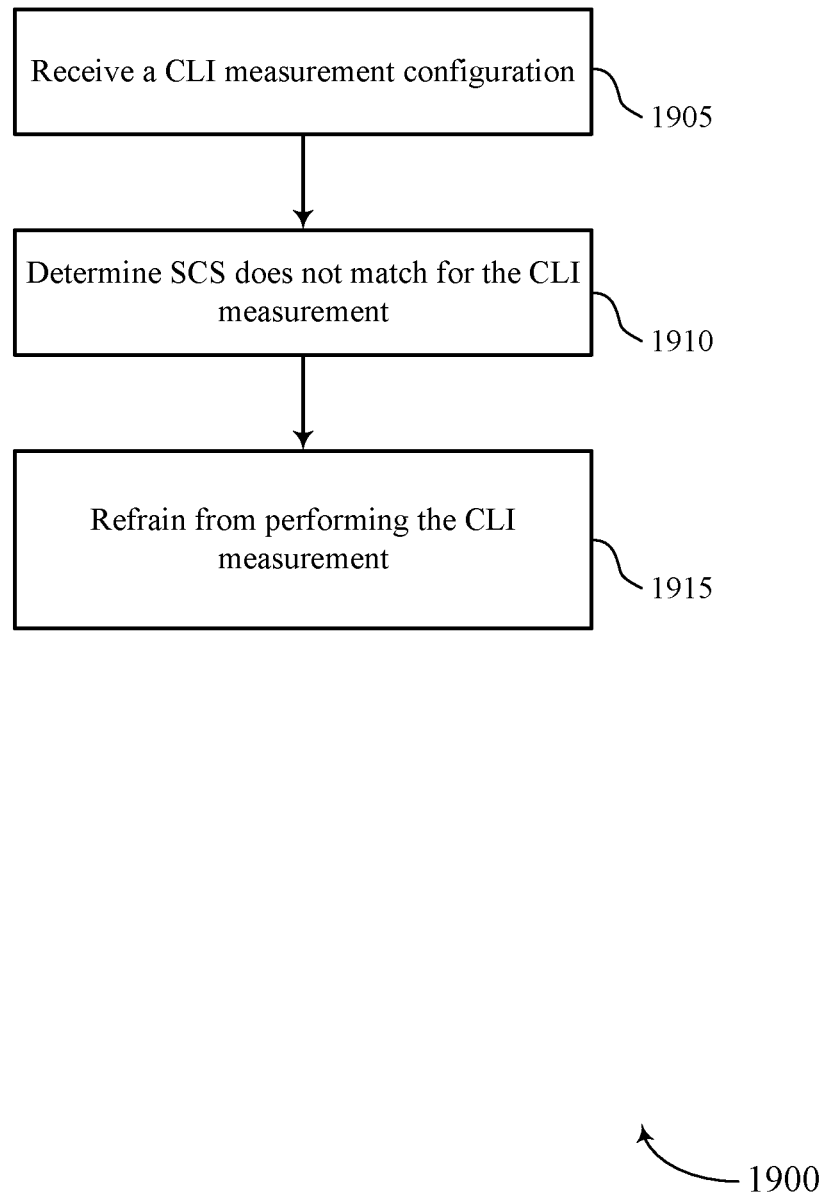

FIG. 19 shows a flowchart illustrating a method 1900 that supports subcarrier spacing for UE-to-UE cross link interference measurement in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may receive a CLI measurement configuration. The UE may be a first UE configured for communication using a first subcarrier spacing, and the CLI measurement configuration may be a configuration for performing a CLI measurement of a signal transmitted from a second UE at a second subcarrier spacing. The operations of 1905 may be performed according to the methods described herein. In some examples, aspects of the operations of 1905 may be performed by a CLI configuration component as described with reference to FIGS. 6 through 9.

At 1910, the UE may determine that SCS does not match for the CLI measurement. For example, the UE may determine the second subcarrier spacing is different from the first subcarrier spacing. The operations of 1910 may be performed according to the methods described herein. In some examples, aspects of the operations of 1910 may be performed by a subcarrier spacing component as described with reference to FIGS. 6 through 9.

At 1915, the UE may refrain from performing the CLI measurement. For example, the UE may refrain from performing the CLI measurement based on determining the second subcarrier spacing being different from the first subcarrier spacing. For example, the UE may be configured to just perform some CLI measurements when the SCS of the transmitter matches the SCS of the receiver. The operations of 1915 may be performed according to the methods described herein. In some examples, aspects of the operations of 1915 may be performed by a measurement refraining component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
receiving, at a user equipment (UE) configured for communication using a first subcarrier spacing associated with an active downlink bandwidth part of the UE, a configuration for performing a reference signal receive power (RSRP)-type cross-link interference (CLI) measurement of a signal, wherein the configuration indicates a second subcarrier spacing associated with the signal; and
performing the RSRP-type CLI measurement based at least in part on the second subcarrier spacing being the same as the first subcarrier spacing.

2. The method of claim 1, further comprising:
reporting a signal characteristic associated with the signal to a serving network device based at least in part on performing the RSRP-type CLI measurement.

3. The method of claim 1, further comprising:
receiving a second configuration for performing a receive signal strength indicator (RSSI)-type CLI measurement at a subcarrier spacing of an aggressor UE;
performing the RSSI-type CLI measurement based at least in part on the subcarrier spacing of the aggressor UE and the first subcarrier spacing being the same or different in accordance with the second configuration for performing the RSSI-type CLI measurement; and reporting a characteristic measured from the RSSI-type CLI measurement to a serving network device.

4. The method of claim 1, wherein the UE is served by a first cell of a first network device and a second UE that transmits the signal is served by a second cell of a second, different network device.

5. The method of claim 1, wherein the UE and a second UE that transmits the signal are served by a same cell.

6. A user equipment (UE) comprising:
one or more memories storing processor-executable code; and
one processor, or multiple processors collectively, coupled with the one or more memories and operable to execute the code to cause the UE to:
receive a configuration for performing a reference signal receive power (RSRP)-type cross-link interference (CLI) measurement of a signal, wherein the UE is configured for communication using a first subcarrier spacing associated with an active downlink bandwidth part of the UE and the configuration indicates a second subcarrier spacing associated with the signal; and
perform the RSRP-type CLI measurement based at least in part on the second subcarrier spacing being the same as the first subcarrier spacing.

7. The UE of claim 6, wherein the one processor is, or the multiple processors collectively are, operable to execute the code to cause the UE to:
report a signal characteristic associated with the signal to a serving network device based at least in part on performing the RSRP-type CLI measurement.

8. The of claim 6, wherein the one processor is, or the multiple processors collectively are, operable to execute the code to cause the UE to:
receive a second configuration for performing a receive signal strength indicator (RSSI)-type CLI measurement at a subcarrier spacing of an aggressor UE;
perform the RSSI-type CLI measurement based at least in part on the subcarrier spacing of the aggressor UE and the first subcarrier spacing being the same or different in accordance with the second configuration for performing the RSSI-type CLI measurement; and
report a characteristic measured from the RSSI-type CLI measurement to a serving network device.

9. The UE of claim 6, wherein the UE is served by a first cell of a first network device and a second UE that transmits the signal is served by a second cell of a second, different network device.

10. The UE of claim 6, wherein the UE and a second UE that transmits the signal are served by a same cell.

11. A non-transitory computer-readable medium storing code for wireless communications, the code comprising instructions executable by one or more processors to:
receive, at a user equipment (UE) configured for communication using a first subcarrier spacing associated with an active downlink bandwidth part of the UE, a configuration for performing a reference signal receive power (RSRP)-type cross-link interference (CLI) measurement of a signal, wherein the configuration indicates a second subcarrier spacing associated with the signal; and
perform the RSRP-type CLI measurement based at least in part on the second subcarrier spacing being the same as the first subcarrier spacing.

12. The non-transitory computer-readable medium of claim 11, wherein the instructions are further executable by the one or more processors to:

report a signal characteristic associated with the signal to a serving network device based at least in part on performing the RSRP-type CLI measurement.

13. The non-transitory computer-readable medium of claim 11, wherein the instructions are further executable by the one or more processors to:
receive a second configuration for performing a receive signal strength indicator (RSSI)-type CLI measurement at a subcarrier spacing of an aggressor UE;
perform the receive signal strength indicator (RSSI)-type CLI measurement based at least in part on the subcarrier spacing of the aggressor UE and the first subcarrier spacing being the same or different in accordance with the second configuration for performing the RSSI-type CLI measurement; and
report a characteristic measured from the RSSI-type CLI measurement to a serving network device.

14. The non-transitory computer-readable medium of claim 11, wherein the UE is served by a first cell of a first network device and a second UE that transmits the signal is served by a second cell of a second, different network device.

15. The method of claim 3, further comprising:
determining that the subcarrier spacing of the aggressor UE is different from the first subcarrier spacing; and
performing the RSSI-type CLI measurement via the active downlink bandwidth part of the UE.

16. The UE of claim 8, wherein the one processor is, or the multiple processors collectively are, operable to execute the code to cause the UE to:
determine that the subcarrier spacing of the aggressor UE is different from the first subcarrier spacing; and
perform the RSSI-type CLI measurement via the active downlink bandwidth part of the UE.

17. A user equipment (UE) comprising:
one or more memories storing processor-executable code; and
one processor, or multiple processors collectively, coupled with the one or more memories and operable to execute the code to cause the UE to:
receive a configuration for performing a reference signal receive power (RSRP)-type cross-link interference (CLI) measurement of a signal, wherein the UE is configured for communication using a first subcarrier spacing of an active downlink bandwidth part of the UE and the configuration indicates a second subcarrier spacing associated with the signal, and wherein a requirement to perform the RSRP-type CLI measurement is not applied based at least in part on the second subcarrier spacing being different from the first subcarrier spacing;
receive a second configuration for performing a receive signal strength indicator (RSSI)-type CLI measurement at a subcarrier spacing of an aggressor UE; and
perform the RSSI-type CLI measurement based at least in part on the subcarrier spacing of the aggressor UE and the first subcarrier spacing being the same or different in accordance with the second configuration for performing the RSSI-type CLI measurement.

18. The UE of claim 17, wherein the one processor is, or the multiple processors collectively are, operable to execute the code to cause the UE to:
report a characteristic measured from the RSSI-type CLI measurement to a serving network device.

19. A method for wireless communications, comprising:
receiving, at a user equipment (UE) configured for communication using a first subcarrier spacing of an active downlink bandwidth part of the UE, a configuration for performing a reference signal receive power (RSRP)-type cross-link interference (CLI) measurement of a signal, wherein the configuration indicates a second subcarrier spacing associated with the signal, and wherein a requirement to perform the RSRP-type CLI measurement is not applied based at least in part on the second subcarrier spacing being different from the first subcarrier spacing;

receiving a second configuration for performing a receive signal strength indicator (RSSI)-type CLI measurement at a subcarrier spacing of an aggressor UE; and performing the RSSI-type CLI measurement based at least in part on the subcarrier spacing of the aggressor UE and the first subcarrier spacing being the same or different in accordance with the second configuration for performing the RSSI-type CLI measurement.

20. The method of claim 19, further comprising:

reporting a characteristic measured from the RSSI-type CLI measurement to a serving network device.

* * * * *